US011313458B2

(12) United States Patent
Sakaguchi

(10) Patent No.: US 11,313,458 B2
(45) Date of Patent: Apr. 26, 2022

(54) SHIFT RANGE CONTROL APPARATUS

(71) Applicant: DENSO CORPORATION, Kariya (JP)

(72) Inventor: Koji Sakaguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 70 days.

(21) Appl. No.: 17/011,111

(22) Filed: Sep. 3, 2020

(65) Prior Publication Data

US 2020/0400229 A1    Dec. 24, 2020

Related U.S. Application Data

(63) Continuation of application No. PCT/JP2019/008502, filed on Mar. 5, 2019.

(30) Foreign Application Priority Data

Mar. 7, 2018   (JP) .............................. JP2018-040584

(51) Int. Cl.
| | |
|---|---|
| *F16H 61/12* | (2010.01) |
| *H02P 23/18* | (2016.01) |
| *F16H 61/32* | (2006.01) |
| *H02P 23/14* | (2006.01) |
| *H02P 29/028* | (2016.01) |

(52) U.S. Cl.
CPC ............ *F16H 61/12* (2013.01); *F16H 61/32* (2013.01); *H02P 23/14* (2013.01); *H02P 23/183* (2016.02); *H02P 29/028* (2013.01); *F16H 2061/1224* (2013.01); *F16H 2061/326* (2013.01)

(58) Field of Classification Search
CPC .. F16H 61/12; F16H 61/32; F16H 2061/1124; F16H 2061/326; F16H 63/48; H02K 7/06; H02K 11/21; H02P 23/14; H02P 23/183; H02P 29/028; H02P 29/24
See application file for complete search history.

(56) References Cited

U.S. PATENT DOCUMENTS

| | | | |
|---|---|---|---|
| 2005/0156550 A1* | 7/2005 | Kamio .................... | F16H 61/32 318/445 |
| 2005/0174084 A1 | 8/2005 | Nakai et al. | |
| 2008/0001568 A1* | 1/2008 | Hori ....................... | F16H 61/32 318/652 |
| 2014/0210395 A1* | 7/2014 | Nagata .................... | F16H 61/32 318/671 |
| 2015/0000450 A1* | 1/2015 | Yatou ..................... | F16H 59/105 74/473.12 |

(Continued)

*Primary Examiner* — Bickey Dhakal
*Assistant Examiner* — Devon A Joseph
(74) *Attorney, Agent, or Firm* — Nixon & Vanderhye P.C.

(57) ABSTRACT

A shift range control apparatus acquires a motor rotation angle signal corresponding to a rotation position of a motor, calculates a motor angle based on a motor rotation angle signal, acquires an output shaft signal corresponding to the rotation position of an output shaft, sets a target rotation angle based on a target shift range and the output shaft signal, drives the motor to cause the motor angle to reach the target rotation angle, determines the shift range based on the output shaft signal, monitors a fault in the output shaft signal, and learns a P-side reference position corresponding to the motor angle in a situation where the engagement member abuts against a first wall portion of the shift range switching mechanism, in a condition that the fault occurs in the output shaft signal.

6 Claims, 14 Drawing Sheets

(56) References Cited

U.S. PATENT DOCUMENTS

| | | | | |
|---|---|---|---|---|
| 2017/0234423 A1* | 8/2017 | Sakaguchi | ................ | H02P 6/24 |
| | | | | 701/59 |
| 2018/0045309 A1* | 2/2018 | Kamada | .................. | F16H 61/28 |
| 2019/0203829 A1* | 7/2019 | Sakaguchi | .............. | F16H 63/38 |

* cited by examiner

SHIFT RANGE CONTROL APPARATUS

CROSS REFERENCE TO RELATED APPLICATIONS

The present application is a continuation application of International Patent Application No. PCT/JP2019/008502 filed on Mar. 5, 2019, which designated the U.S. and claims the benefit of priority from Japanese Patent Application No. 2018-040584 filed on Mar. 7, 2018. The entire disclosures of all of the above applications are incorporated herein by reference.

TECHNICAL FIELD

The present disclosure relates to a shift range control apparatus.

BACKGROUND

A range switching mechanism may switch a shift range by driving a motor. For example, a target motor rotation angle may be set by adopting an angle of an output shaft sensor.

SUMMARY

The present disclosure describes a shift range control apparatus that switches a shift range through driving of a motor in a shift range switching system. The shift range switching system includes the motor, an output shaft to which the driving of the motor is transmitted, and a shift range switching mechanism.

BRIEF DESCRIPTION OF DRAWINGS

The present disclosure will become more apparent from the following detailed description made with reference to the accompanying drawings. In the drawings.

DETAILED DESCRIPTION

Figure 1:
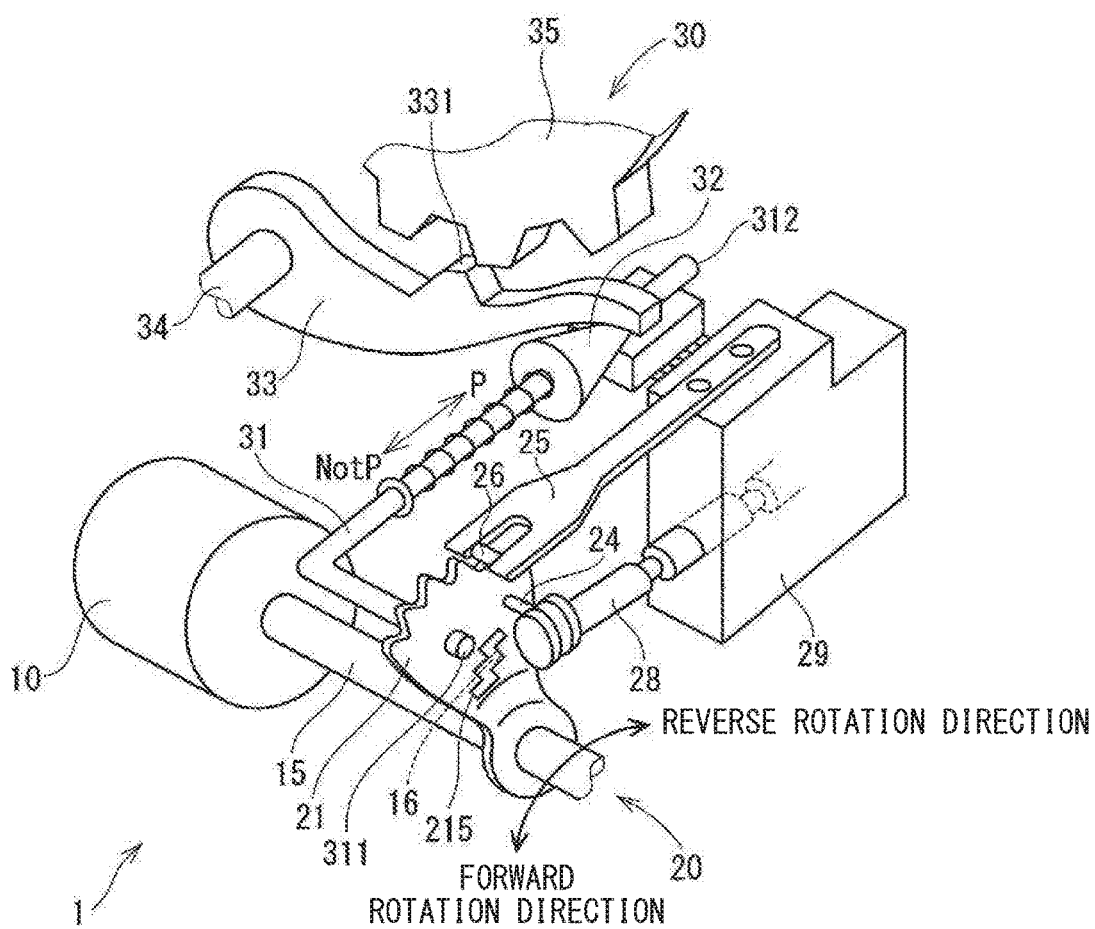
FIG. 1 is a perspective view showing a shift-by-wire system according to a first embodiment.

A range switching mechanism may switch a shift range by driving a motor. A target motor rotation angle may be set by adopting an angle of an output shaft sensor. However, in a situation where a fault occurs in an output shaft sensor, a target position may not be corrected by adopting a detection value of the output shaft sensor, and therefore the positioning accuracy may degrade. Additionally, it may not be monitored whether a control is executed in accordance with a target range based on the detection value of the output shaft sensor.

According to a first aspect of the present disclosure, a shift range control apparatus switches a shift range through driving of a motor in a shift range switching system. The shift range switching system includes a motor, an output shaft, and a shift range switching mechanism. The output shaft transmits the driving of the motor. The shift range switching mechanism includes a rotation member and an engagement member. The rotation member includes multiple roots, a first wall portion and a second wall portion, and the rotation member rotates with the output shaft. The multiple roots includes: a first root that is disposed close to a first end of the rotation member and corresponding to a park range; and a second root that is disposed close to a second end of the rotation member opposite from the first end and corresponding to a range other than the park range. The first wall portion is disposed closer to the first end of the rotation member than the first root, and the second wall portion is disposed closer to the second end of the rotation member than the second root. The engagement member is capable of fitting into the one of the roots corresponding to the shift range.

A motor angle calculator acquires, from a motor rotation angle sensor for detecting rotation of the motor, a motor rotation angle signal corresponding to a rotation position of the motor and calculate a motor angle based on the motor rotation angle signal. An output shaft signal acquisition sensor acquires, from an output shaft sensor for detecting a rotation position of the output shaft, an output shaft signal corresponding to the rotation position of the output shaft. A target angle setting device sets a target rotation angle based on a target shift range and the output shaft signal. A drive controller drives the motor to cause the motor angle to reach the target rotation angle.

A range determiner determines the shift range based on the output shaft signal. A fault monitor monitors a fault of the output shaft signal. When a fault occurs in the output shaft signal, a learning device can learn the P-side reference position corresponding to the motor angle when the engagement member abuts against the first wall portion.

In a condition that a fault occurs in the output shaft signal, the learning device learns the P-side reference position by bringing the engagement member into contact with the first wall portion when the shift range when a fault occurs in the output shaft signal is the park range. The range determiner determines the shift range based on the P-side reference position and the motor angle. The target angle setting device sets a target rotation angle based on the P-side reference position.

According to a second aspect of the present disclosure, a shift range control apparatus switches a shift range by controlling the driving of a motor in a shift range switching system. The shift range switching system includes a motor, an output shaft, and a shift range switching mechanism. The output shaft transmits the driving of the motor. The shift range switching mechanism includes a rotation member and an engagement member. The rotation member includes multiple roots, a first wall portion and a second wall portion, and the rotation member rotates with the output shaft. The multiple roots includes: a first root that is disposed close to a first end of the rotation member and corresponding to a park range; and a second root that is disposed close to a second end of the rotation member opposite from the first end and corresponding to a range other than the park range. The first wall portion is disposed closer to the first end of the rotation member than the first root, and the second wall portion is disposed closer to the second end of the rotation member than the second root. The engagement member is capable of fitting into the one of the roots corresponding to the shift range.

The shift range control apparatus according to the second aspect includes a processor and a memory that stores instructions to, when executed by the processor, cause the processor to: acquire, from a motor rotation angle sensor configured to detect rotation of the motor, a motor rotation angle signal corresponding to a rotation position of the motor and calculate a motor angle based on the motor rotation angle signal; acquire, from an output shaft sensor configured to detect a rotation position of the output shaft, an output shaft signal corresponding to the rotation position of the output shaft; set a target rotation angle based on a target shift range and the output shaft signal; drive the motor to cause the motor angle to reach the target rotation angle; determine the shift range based on the output shaft signal; monitor a fault in the output shaft signal; and learn a P-side reference position corresponding to the motor angle in a situation where the engagement member abuts against the first wall portion, in a condition that the fault occurs in the output shaft signal. Additionally, in a condition that the fault occurs in the output shaft signal, the instructions further cause the processor to: learn the P-side reference position by causing the engagement member to abut against the first wall portion through the driving of the motor, in a situation where the shift range at an occurrence of the fault in the output shaft signal is a park range; determine the shift range based on the P-side reference position and the motor angle; and set the target rotation angle based on the P-side reference position.

According to the first and second aspects of the shift range control apparatus, the retraction traveling performance can be ensured even when the output shaft signal has a fault.

First Embodiment

A shift range control apparatus will be described with reference to the drawings. Hereinafter, in multiple embodiments, substantially the same components are denoted by the same reference numerals, and a description of the same components will be omitted.

Figure 2:
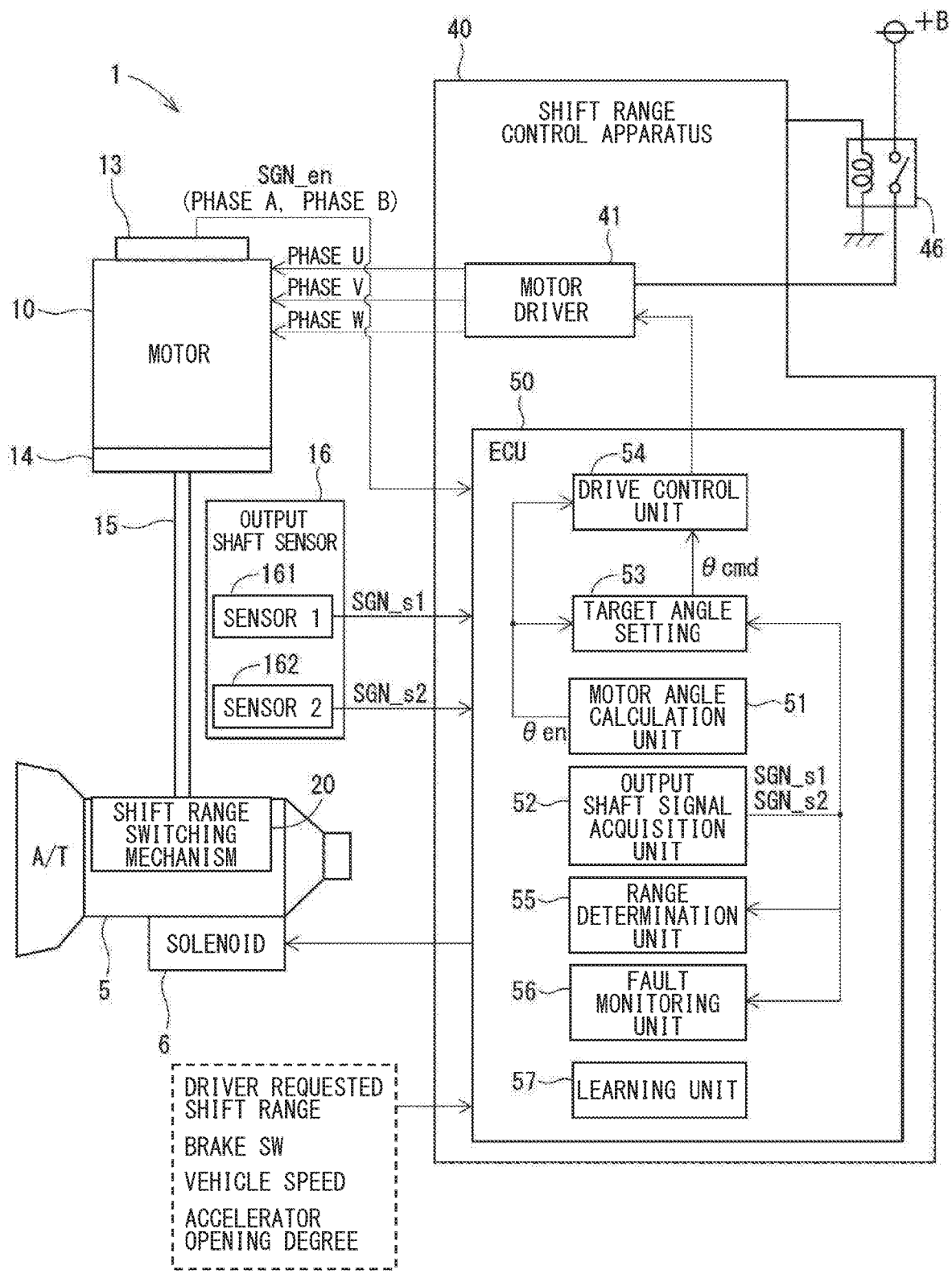
FIG. 2 is a schematic configuration diagram showing the shift-by-wire system according to the first embodiment.

A shift range control apparatus according to a first embodiment is shown in FIGS. 1 to 8. As shown in FIGS. 1 and 2, a shift-by-wire system 1 as a shift range switching system includes a motor 10, a shift range switching mechanism 20, a parking lock mechanism 30, a shift range control apparatus 40, and the like.

The motor 10 rotates while receiving an electric power from a battery mounted on a vehicle (not shown), and functions as a driving source of the shift range switching mechanism 20. The motor 10 according to the present embodiment is a switched reluctance motor, but any type of motor, such as a DC motor, may also be adopted.

As shown in FIG. 2, an encoder 13, which is a motor rotation angle sensor, detects a rotation position of a rotor (not shown) of the motor 10. The encoder 13 is, for example, a magnetic rotary encoder, and includes a magnet that rotates integrally with the rotor, a Hall IC for magnetic detection, and the like. The encoder 13 outputs pulse signals of the A-phase and the B-phase at every predetermined angle in synchronization with the rotation of the rotor. Hereinafter, a signal from the encoder 13 is referred to as a motor rotation angle signal SGN_en. A speed reducer 14 is provided between a motor shaft of the motor 10 and an output shaft 15, and reduces the rotation of the motor 10 and outputs the reduced rotation to the output shaft 15. As a result, the rotation of the motor 10 is transmitted to the shift range switching mechanism 20.

The output shaft sensor 16 includes a first sensor unit 161 and a second sensor unit 162, and detects the rotation position of the output shaft 15. The output shaft sensor 16 according to the present embodiment is a magnetic sensor for detecting a change in a magnetic field of a target 215 (see FIG. 1) provided on a detent plate 21 serving as a rotating member, and is attached to a position where the magnetic field of the target 215 can be detected. In the drawing, a first sensor unit 161 (or may also be referred to as a first sensor) is referred to as "sensor 1" and the second sensor unit 162 (or may be referred to as a second sensor) is referred to as "sensor 2".

The sensor units 161 and 162 are so-called MR sensors each having a magnetoresistance effect element (MR element) for detecting a change in the magnetic field of the target 215. The first sensor unit 161 detects a magnetic field corresponding to the rotation position of the target 215, and outputs an output shaft signals Sg1 to an ECU 50. The second sensor unit 162 detects a magnetic field corresponding to the rotation position of the target 215, and outputs an output shaft signal Sg2 to the ECU 50. The output shaft sensor 16 according to the present embodiment includes two sensor units 161 and 162, which independently transmit output shaft signals SGN_s1 and SGN_s22 to the ECU 50, respectively. In other words, the output shaft sensor 16 is a double system (duel system). Hereinafter, the output shaft signals SGN_s1 and SGN_s2 are collectively referred to simply as an output axis signal SGN_s.

As shown in FIG. 1, the shift range switching mechanism 20 includes a detent plate 21, a detent spring 25 as an urging member or a biasing member, and the like, and transmits a rotational driving force output from the speed reducer 14 to a manual valve 28 and the parking lock mechanism 30. The detent plate 21 is fixed to the output shaft 15 and driven by the motor 10. In the present embodiment, it may be assumed that a direction in which the detent plate 21 moves away from a base of the detent spring 25 is a forward rotation direction and a direction in which the detent template 21 moves closer to the base portion is a reverse rotation direction.

The detent plate 21 is provided with a pin 24 projecting parallel to the output shaft 15. The pin 24 is connected to a manual valve 28. When the detent plate 21 is driven by the motor 10, the manual valve 28 reciprocates in the axial direction. In other words, the shift range switching mechanism 20 converts a rotational motion of the motor 10 into a linear motion and transmits the linear motion to the manual valve 28. The manual valve 28 is provided in the valve body 29. When the manual valve 28 reciprocates in the axial direction, a hydraulic supply path to a hydraulic clutch (not shown) is switched, and an engagement state of the hydraulic clutch is switched, to thereby change the shift range.

The detent plate 21 is provided with a target 215 so that the magnetic field changes in accordance with the rotation of the output shaft 15. The target 215 is made of a magnetic material. The target 215 may be another member different from the detent plate 21, and if the detent plate 21 is made of a magnetic material, for example, the target 215 may be formed by applying a press working or the like to the detent plate 21. The target 215 is formed so that the output voltage, which is the output shaft signal SNG_s of the output shaft sensor 16, changes in a stepwise manner in accordance with the rotation position of the output shaft 15.

Figure 3:
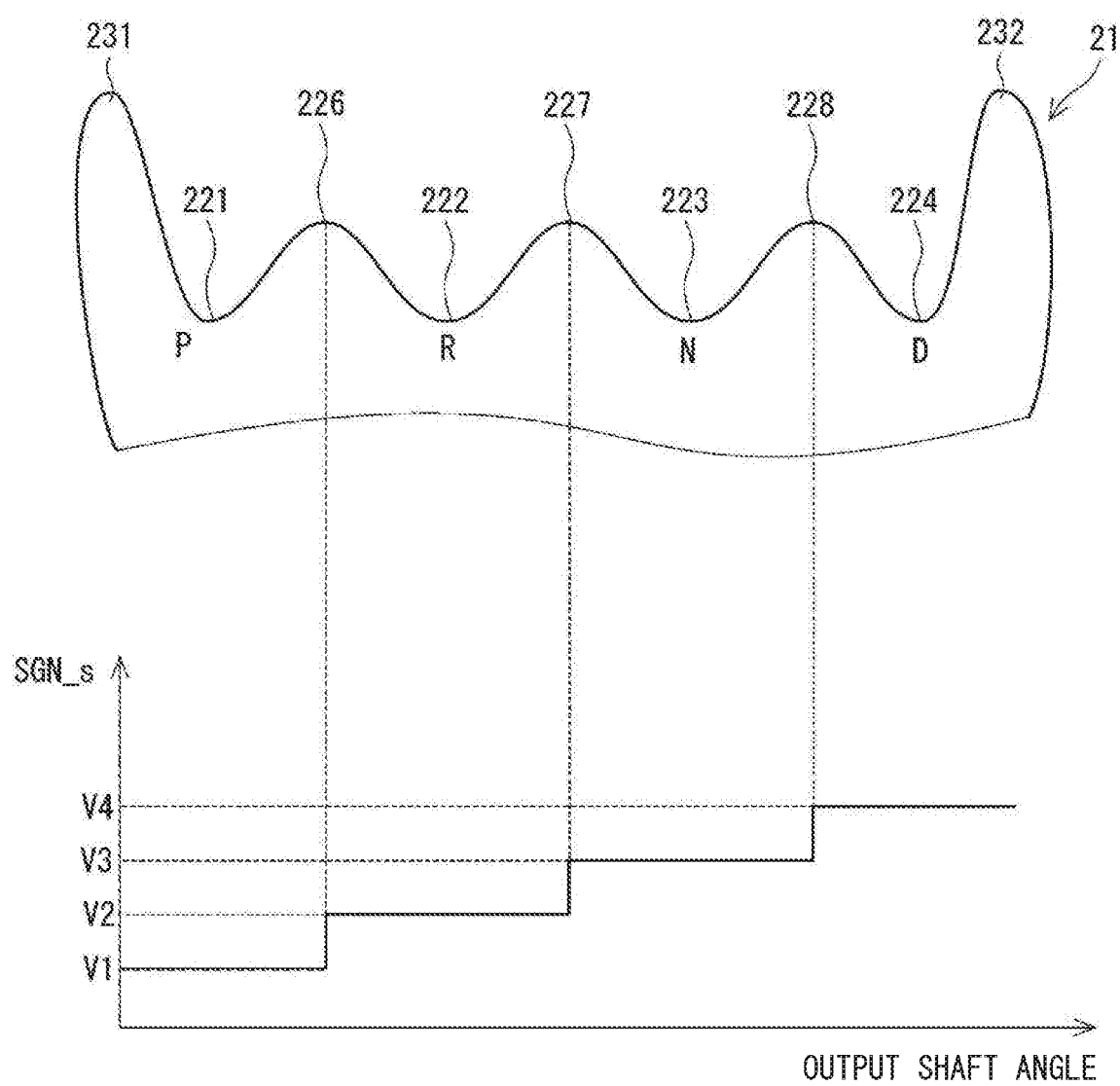
FIG. 3 is an illustrative diagram illustrating a detent plate and an output shaft signal according to the first embodiment.

As schematically shown in FIG. 3, four roots 221 to 224 are provided on the detent spring 25 side of the detent plate 21. The roots 221 to 224 correspond to the respective ranges of P (park), R (reverse), N (neutral), and D (drive). A crest 226 is provided between the root 221 corresponding to the P range and the root 222 corresponding to the R range. A crest 227 is provided between the root 222 corresponding to the R range and the root 223 corresponding to the N range. A crest 228 is provided between the root 223 corresponding to the N range and the root 224 corresponding to the D range. A first wall portion 231 for restricting the movement of the detent roller 26 is formed on a side of the root 221 corresponding to the P range opposite to the crest 226. A second wall portion 232 for restricting the movement of the detent roller 26 is formed on a side of the root 224 corresponding to the D range opposite to the crest 228. In the present embodiment, the root 221 corresponds to a "first root", the root 224 corresponds to a "second root", and the roots 222 and 223 correspond to a "third root". In addition, the D range corresponds to a "P-opposite-side range", and the R range and the N range correspond to an "intermediate range".

The output shaft signal SNG_s takes four values, that is, a value V1 corresponding to the P range, a value V2 corresponding to the R range, a value V3 corresponding to the N range, and a value V4 corresponding to the D range. In the present embodiment, the value is switched when the detent roller 26 is at vertices of the crests 226, 227, and 228, but the switching point of the value may be any point as long as the point is out of each range guaranteed range. The available values V1 to V4 of the output shaft signal SNG_s are discrete, and the intermediate values of the respective values are not taken. In addition, a difference between the values is set to be sufficiently large as compared with a sensor error or the like. In other words, in the present embodiment, the value of the output shaft signal SNG_s changes stepwise. As a supplement, in the present embodiment, the output shaft signal SNG_s is switched to a different value to such an extent that the value cannot be regarded as continuous with the rotation of the output shaft 15, which is assumed to be "the value changes step by step". The differences between the respective values may be equal to each other or different from each other.

As shown in FIG. 1, the detent spring 25 is an elastically deformable plate-like member, and the detent roller 26 as an engagement member is provided at a tip of the detent spring 25. The detent spring 25 urges the detent roller 26 toward the center of rotation of the detent plate 21. When a predetermined or more rotating force is applied to the detent plate 21, the detent spring 25 elastically deforms, and the detent roller 26 moves between the respective roots 221 to 224. When the detent roller 26 fits into one of the roots 221 to 224, the swinging of the detent plate 21 is regulated, the axial position of the manual valve 28 and the state of the parking lock mechanism 30 are determined, and the shift range of the automatic transmission 5 is fixed. The detent roller 26 fits in anyone of the roots 221 to 224 corresponding to the shift range. In the present embodiment, portions into which the detent roller 26 fits by the aid of a spring force of the detent spring 25 in accordance with the shift range is bottommost portions of the roots 221 to 224.

The parking lock mechanism 30 includes a parking rod 31, a conical body 32, a parking lock pawl 33, a shaft portion 34, and a parking gear 35. The parking rod 31 is formed in a substantially L-shape, and one end 311 is fixed to the detent plate 21. The other end 312 of the parking rod 31 is provided with the conical body 32. A diameter of the conical body 32 decreases toward the other end 312. When the detent plate 21 swings in a reverse rotation direction, the conical body 32 moves in a direction P.

The parking lock pawl 33 abuts a conical surface of the conical body 32, and a projection portion 331 that can mesh with the parking gear 35 is provided on the parking gear 35 side of the parking lock pawl 33 that is provided so as to be swingable about the shaft portion 34. When the detent plate 21 rotates in the reverse rotation direction and the conical body 32 moves in a direction P, the parking lock pawl 33 is pushed up, and the projection portion 331 and the parking gear 35 mesh with each other. On the other hand, when the detent plate 21 rotates in a forward rotational direction and the conical body 32 moves in a direction NotP, the engagement between the projection portion 331 and the parking gear 35 is released.

The parking gear 35 is provided on an axle (not shown) so as to be engageable with the projection portion 331 of the parking lock pawl 33. When the parking gear 35 and the projection portion 331 are engaged with each other, the rotation of the axle is restricted. When the shift range is a NotP range, the parking gear 35 is not locked by the parking lock pawl 33, and the rotation of the axle is not hindered by the parking lock mechanism 30. When the shift range is the P range, the parking gear 35 is locked by the parking lock pawl 33, and the rotation of the axle is regulated.

As shown in FIG. 2, the shift range control apparatus 40 includes a motor driver 41, an ECU 50, and the like. The motor driver 41 outputs drive signals relating to the energization of the respective phases (U-phase, V-phase, and W-phase) of the motor 10. A motor relay 46 is provided between the motor driver 41 and the battery. The motor relay 46 is turned on when a start switch of the vehicle such as an ignition switch or the like is turned on, and an electric power is supplied to the motor 10. The motor relay 46 is turned off when the start switch is off, and the supply of the electric power to the motor 10 is cut off. In addition, with on/off control of the motor relay 46, power supply or cut-off to the motor 10 is switched.

The ECU 50 is configured by one or more microcomputers and includes a CPU, a ROM, a RAM, an I/O, a bus line for connecting those configurations, and so on. The processing in the ECU 50 may be software processing by allowing a CPU to execute a program stored in advance in a tangible memory device such as a ROM (that is, a readable non-transitory tangible recording medium), or hardware processing by dedicated electronic circuits.

The ECU 50 controls the switching of the shift range by controlling the driving of the motor 10 based on a driver requested shift range, a signal from the brake switch, a vehicle speed, and the like. The ECU 50 controls the driving of a shift hydraulic control solenoid 6 based on a vehicle speed, an accelerator opening degree, a driver requested shift range, and the like. The shift stage is controlled by controlling the shift hydraulic control solenoid 6. The shift hydraulic control solenoids 6 of the number corresponding to the number of transmission stages and the like are provided. In the present embodiment, one ECU 50 controls the driving of the motor 10 and the solenoid 6, but a motor ECU for controlling the motor 10 and an AT-ECU for controlling the solenoid may be separated from each other. Hereinafter, the drive control of the motor 10 will be described.

The ECU 50 includes, for example, a motor angle calculation unit 51 (or may be referred to as a motor angle calculator), an output shaft signal acquisition unit 52 (or may be referred to as output shaft signal acquisition sensor), a target angle setting unit 53 (or may be referred to as a target angle setting device), a drive control unit 54 (or may be referred to as a drive controller), a range determination unit 55 (or may be referred to as a range determiner), an fault monitoring unit 56 (or may be referred to as a fault monitor), and a learning unit 57 (or may be referred to as a learning device). The motor angle calculation unit 51 counts pulse edges of the phase A-phase signal and the phase B-phase signal based on the motor rotation angle signal SGN_en acquired from the encoder 13, and calculates an encoder count value θen. The encoder count value θen is a value corresponding to the rotation position of the motor 10 and corresponds to a "motor angle". The output shaft signal acquisition unit 52 acquires an output shaft signal SGN_s from the output shaft sensor 16.

The target angle setting unit 53 sets a target count value θcmd for stopping the motor 10 based on the target shift range and the output shaft signal SGN_s. In the present embodiment, the target angle setting unit 53 stores a correction value corresponding to an angle from a change point of the output shaft signal SGN_s to the bottommost portion of each of the roots 221 to 224 in advance, and sets the target count value θcmd based on the encoder count value and the correction value when the output shaft signal SNG_s changes. The target count value θcmd corresponds to a "target rotation angle". The drive control unit 54 controls the driving of the motor 10 by a feedback control or the like so that the encoder count value θen reaches the target count value θcmd. However, the drive control of the motor 10 may also be any other types.

The range determination unit 55 determines an actual shift range based on the output shaft signal SGN_s. The fault monitoring unit 56 monitors the fault of the output shaft signal SGN_s. In the present embodiment, the fault monitoring unit 56 compares the output shaft signals SGN_s1 and SGN_s2 with each other, and when it is determined that the difference is larger than or equal to an fault determination threshold, the fault monitoring unit 56 determines that a sensor error fault has occurred. When the output shaft signal SGN_s is larger than a normal upper limit value or smaller than a normal lower limit value, the fault monitoring unit 56 determines that there is a fault.

When a fault occurs in the output shaft signal SGN_s, the learning unit 57 learns the P-side reference position θen_p, which is the encoder count value θen when the detent roller 26 abuts against the first wall portion 231. In the present embodiment, the learning unit 57 does not learn the reference position if the output shaft signal SGN_s is normal. Therefore, it is possible to reduce a load applied to the shift range switching mechanism 20. In FIG. 2, some control lines are omitted in order to avoid complication.

In the present embodiment, the learning unit 57 sets the target count value θcmd and determines the actual range by adopting the output shaft signal SGN_s. If the output shaft signal SGN_s turns out to have a fault, the target count value θcmd cannot be corrected, and the positioning accuracy may deteriorate. Since it cannot be monitored whether the control is performed in accordance with the target range, that an appropriate fail-safe treatment may not be executed.

Therefore, in the present embodiment, when a fault occurs in the output shaft signal SGN_s, a P wall abutment process for learning the reference position by bringing the detent roller 26 into abutment with the first wall portion 231 is executed as immediately as possible to secure the retraction traveling. It can also be considered that the wall abutment process is a learning process for learning the reference position.

Figure 4:
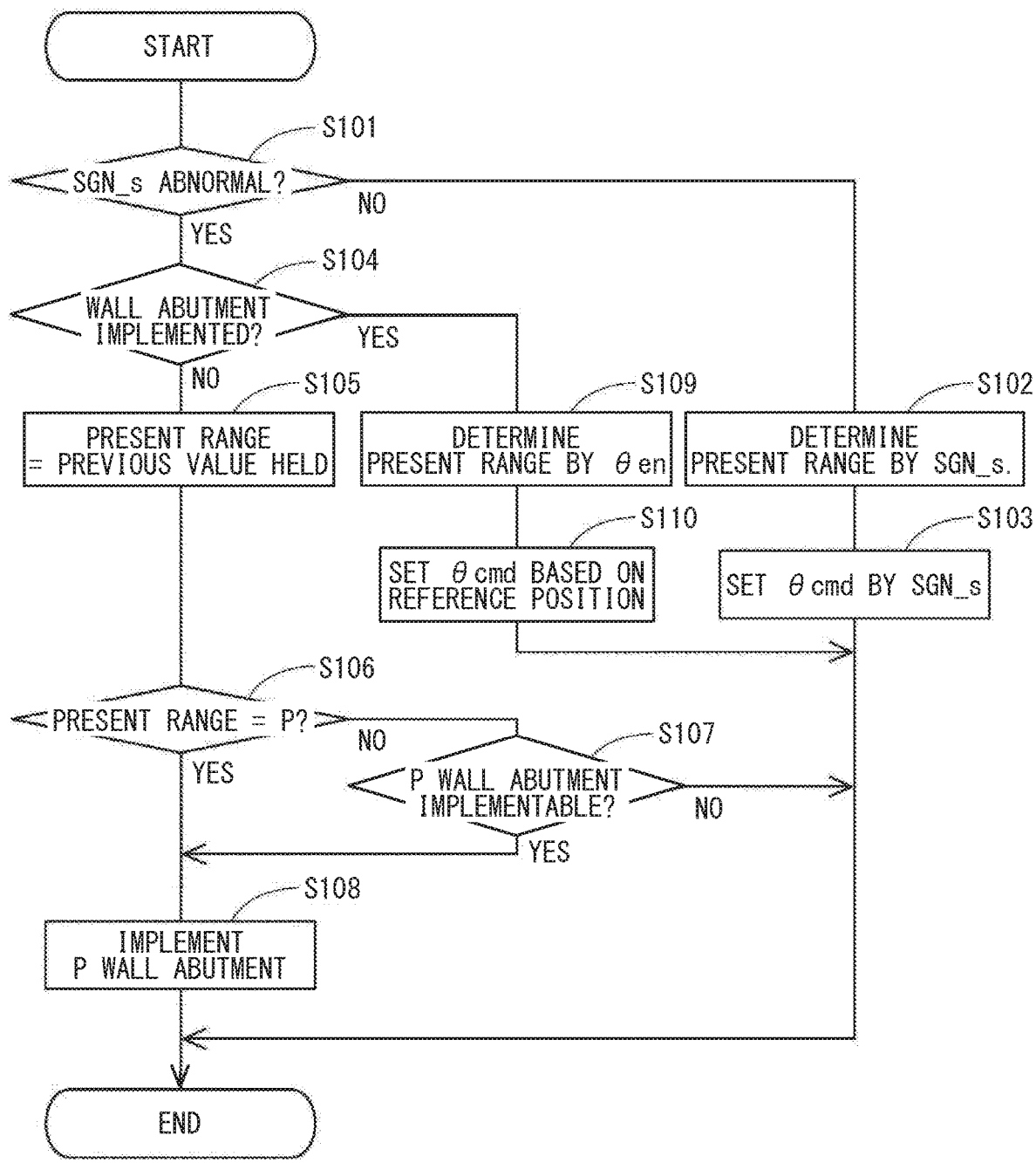
FIG. 4 is a flowchart illustrating an output shaft sensor fault process according to the first embodiment.

The output shaft sensor fault processing of the present embodiment will be described with reference to the flowchart of FIG. 4. This process is executed by the ECU 50 in a predetermined cycle.

In S101, the fault monitoring unit 56 determines whether the output shaft signal SGN_s has a fault (in other words, whether the output shaft signal SGN-s is in an abnormal state). When it is determined that the output shaft signal SGN_s has a fault (YES in S101), the process proceeds to S104. When it is determined that the output shaft signal SGN_s is in a normal state (NO in S101), the process proceeds to S102.

In S102, the range determination unit 55 determines the present range based on the output shaft signal SGN-s. In S103, the target angle setting unit 53 sets the target count value θcmd based on the output shaft signal SGN-s. Specifically, the range determination unit 55 corrects the target count value θcmd based on the encoder count value θen and the correction value at a timing when the output shaft signal SGN_s changes.

In a S104 to which the process proceeds when the output shaft signal SGN-s is determined to have a fault (YES in S101), the learning unit 57 determines whether the wall abutment process has been executed. In this example, when a wall abutment completion flag to be described later is set, it is determined that the wall abutment process has been executed. If it is determined that the wall abutment process has been executed (YES in S104), the process proceeds to S109. If it is determined that the wall abutment process has not been executed (NO in S104), the process proceeds to S105, and a previous value is held as the present range.

In S106, the learning unit 57 determines whether the present shift range is the P range. When it is determined that the present shift range is the P range (YES in S106), the process proceeds to S108. When it is determined that the present shift range is not the P range (NO in S106), the process proceeds to S107.

In S107, the learning unit 57 determines whether the P wall abutment process can be executed. In the present embodiment, when the target shift range is switched to the P range and the vehicle speed is 0, it is determined that the P wall abutment process can be executed. When the vehicle speed is smaller than a stop determination threshold set to a value close to 0, the vehicle speed may be regarded as 0. If it is determined that the P wall abutment process can be executed (YES in S107), the process proceeds to S110. If it is determined that the P wall abutment process cannot be executed (NO in S107), the following processing is not executed, and the present routine is completed.

In S108, the ECU 50 executes the P wall abutment process. In the P wall abutment process, the motor 10 is rotated in a reverse direction at a speed lower than that at the time of normal range switching so that the detent roller 26 abuts against the first wall portion 231. When the state in which the encoder count value θen does not change continues over a completion determination time Xf, the encoder count value en at this time is stored as the P-side reference position θen_p in the storage unit (not shown). In addition, the wall abutment completion flag is set. The wall abutment completion flag is maintained in a set state until the start switch, which is an ignition switch or the like of the vehicle, is turned off, and is reset when the start switch is turned off.

In S109 to which the process proceeds (YES in S104) when the wall abutment has been implemented, the range determination unit 55 determines the present shift range based on the learned P-side reference position θen_p, the range determination value stored in advance, and the current encoder count value θen. The range determination value is set for each range, and is a count number from the first wall portion 231 that determines that the range determination value is the above range. Further, the range determination value may be set such that a predetermined range including the target design values Kp, Kr, Kn, and Kd is determined to be each range, and there may be an indefinite region between the range determination values. The same applies to the case where the D-side reference position θen_d is used.

In S110, the target angle setting unit 53 sets the target count value θcmd based on the target shift range and the learned P-side reference position θen_p. Specifically, the target angle setting unit 53 calculates the target count value θcmd based on the target design values Kp, Kr, Kn, and Kd corresponding to the target shift range and the P-side reference position θen_p. As shown in FIGS. 5 to 8, the target design values Kp, Kr, Kn, and Kd are encoder counts corresponding to angles between the first wall portion 231 and the bottommost portions of the roots 221 to 224.

Mathematical Expression (1) shows the target count value θcmd when the target shift range is the P range, Mathematical Expression (2) shows the target count value θcmd when the target shift range is the R range, Mathematical Expression (3) shows the target count value θcmd when the target shift range is the N range, and Mathematical Expression (4) shows the target count value θcmd when the target shift range is the D range.

$$\theta cmd = \theta en\_p + Kd \quad (1)$$

$$\theta cmd = \theta en\_p + Kn \quad (2)$$

$$\theta cmd = \theta en\_p + Kr \quad (3)$$

$$\theta cmd = \theta en\_p + Kp \quad (4)$$

The output shaft sensor fault process of the present embodiment will be described with reference to the time charts of FIGS. 5 to 8. FIGS. 5 to 8 show the range determinations based on the output shaft signal SGN_s and the encoder count value en, and the encoder count value θen from an upper side, with a common time axis as a horizontal axis in each of FIGS. 5 to 8. A vertical axis of the encoder count value θen describes the corresponding range, where "P" is the value when the detent roller 26 is located at the bottommost portion of the root 221 corresponding to the P range. The same applies to the drawings relating to the embodiments to be described later. In the drawings, a state in which a fault occurs in the output shaft signal SGN_s is described as "fault", and a state in which the range determination is not executed by the encoder count value θen is described as "undetermined".

Figure 5:
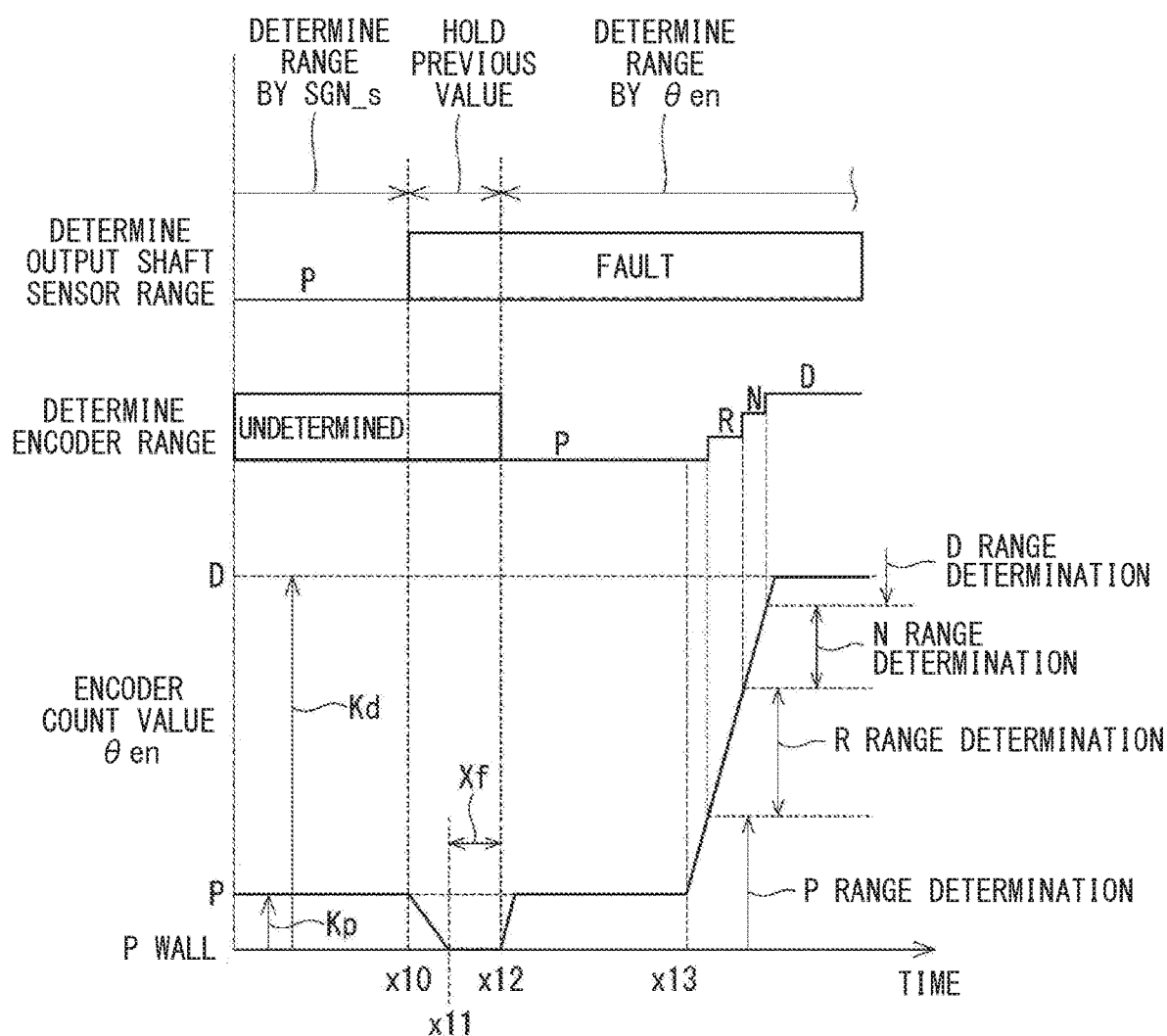
FIG. 5 is a time chart illustrating the output shaft sensor fault process according to the first embodiment.

FIG. 5 shows an example in which a fault occurs in the output shaft signal SGN_s when the shift range is the P range. While the output shaft signal SGN_s is in the normal state, the range determination based on the output shaft signal SGN_s is executed, and the range determination based on the encoder count value θen is not executed. When the output shaft signal SGN_s has a value V1 and a fault occurs in the output shaft signal SGN_s at a time x10 at which the P range is determined, the P wall abutment process is immediately executed. Specifically, the detent roller 26 rotates the motor 10 in a direction toward the first wall portion 231. At this time, in order to reduce the impact on the range switching mechanism 20 caused by the detent roller 26 brought into abutment with the first wall portion 231, the motor 10 is rotated by switching an energization phase at a speed lower than that at the time of normal range switching every energization phase switching time. The same applies to the P wall abutment process from other ranges and the D wall abutment process in the embodiments to be described later.

At a time x11, when the detent roller 26 brings into abutment with the first wall portion 231, the encoder count value θen is kept constant. At a time x12 when a completion determination time Xf elapses after the encoder count value θen is kept constant, the P wall abutment process is completed, and the encoder count value θen at this time is stored as the P-side reference position θen_p. The shift range holds the P range of the previous value between the time x10 at which the fault of the output shaft signal SGN_s occurs and the time x12 at which the P wall abutment process is completed.

When the P wall abutment process is completed, the motor 10 is rotated in the opposite direction by the target design value Kp, and the detent roller 26 is returned to the bottommost portion of the root 221. The rotation speed of the motor 10 at this time may be larger than that at the time of performing the wall abutment process, and may be, for example, the same as that at the time of normal range switching.

When the target shift range is switched to the D range at a time x13, the target count value θcmd is set based on the P-side reference position θen_p and a target design value Kd (see Mathematical Expression (1)), and the motor 10 is driven so that the encoder count value θen reaches the target count value θcmd. The rotation speed of the motor 10 at that time may be higher than that at the time of performing the wall abutment process, and may be, for example, the same as that at the time of normal range switching.

The range determination unit 55 determines the shift range based on the encoder count value θen. In FIG. 5, the range determination ranges are continuous, but a range indefinite region may be provided between the respective range determination ranges.

Figure 6:
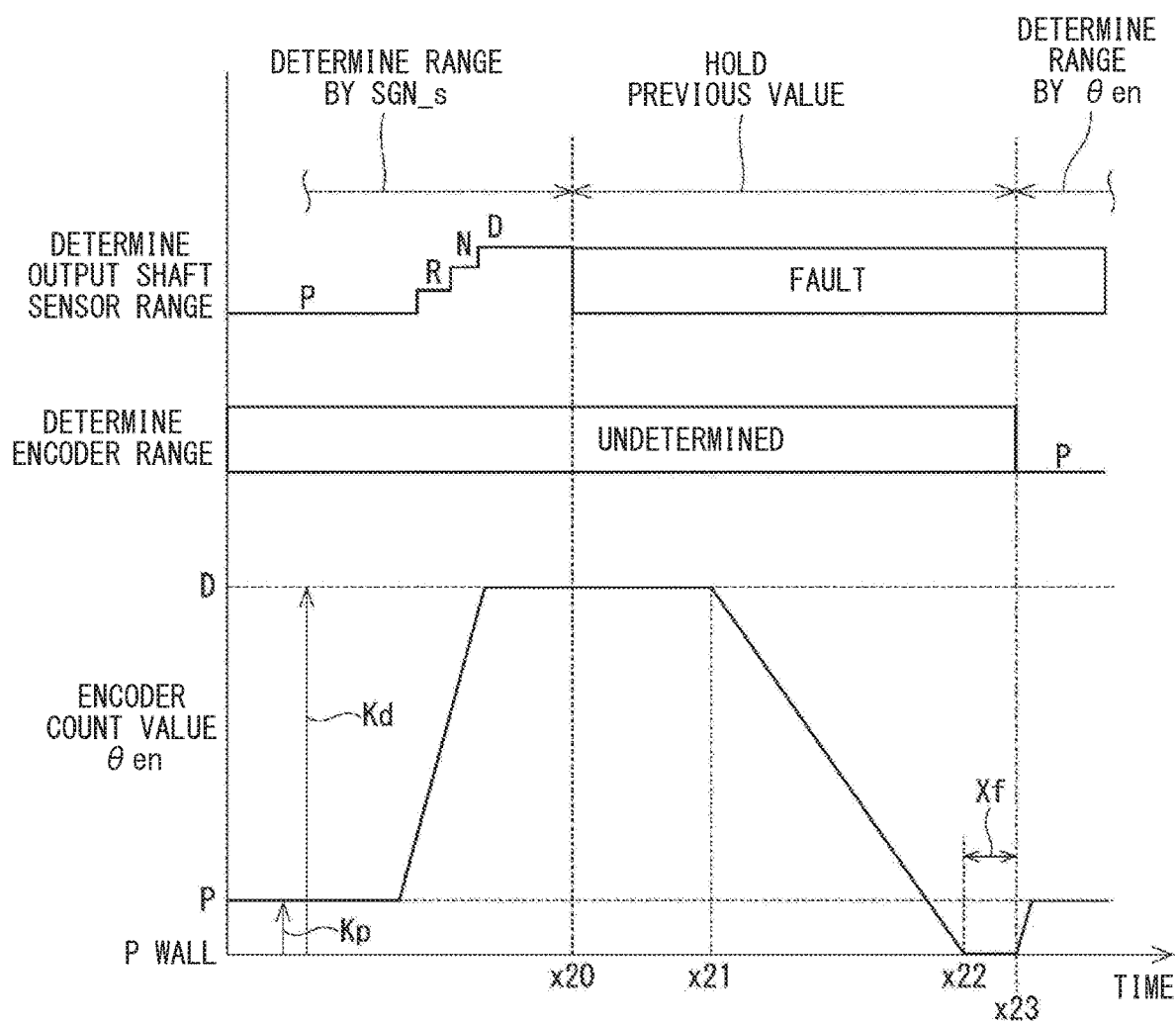
FIG. 6 is a time chart illustrating the output shaft sensor fault process according to the first embodiment.

FIG. 6 shows an example in which a fault occurs in the output shaft signal SGN_s when the shift range is the D range. When the output shaft signal SGN_s is a value V4 and a fault occurs in the output shaft signal SGN_s at a time x20 at which the D range is determined, the range determination based on the output shaft signal SGN_s is stopped, and the D range of the previous value is held. At a time x21, when the target shift range is switched to the P range at the vehicle speed of 0, the P wall abutment process is executed.

At a time x22, when the detent roller 26 brings into abutment with the first wall portion 231, the encoder count value θen is kept constant. At a time x23 when a completion determination time Xf elapses after the encoder count value θen is kept constant, the wall abutment process is completed, and the encoder count value en at this time is stored as the P-side reference position θen_p. Thereafter, the target count value θcmd is set based on the P-side reference position θen_p, and range determination is executed based on the encoder count value θen. The motor 10 is also rotated in the opposite direction to return the detent roller 26 to the bottommost portion of the root 221. Thereafter, the range determination is executed based on the encoder count value θen.

Figure 7:
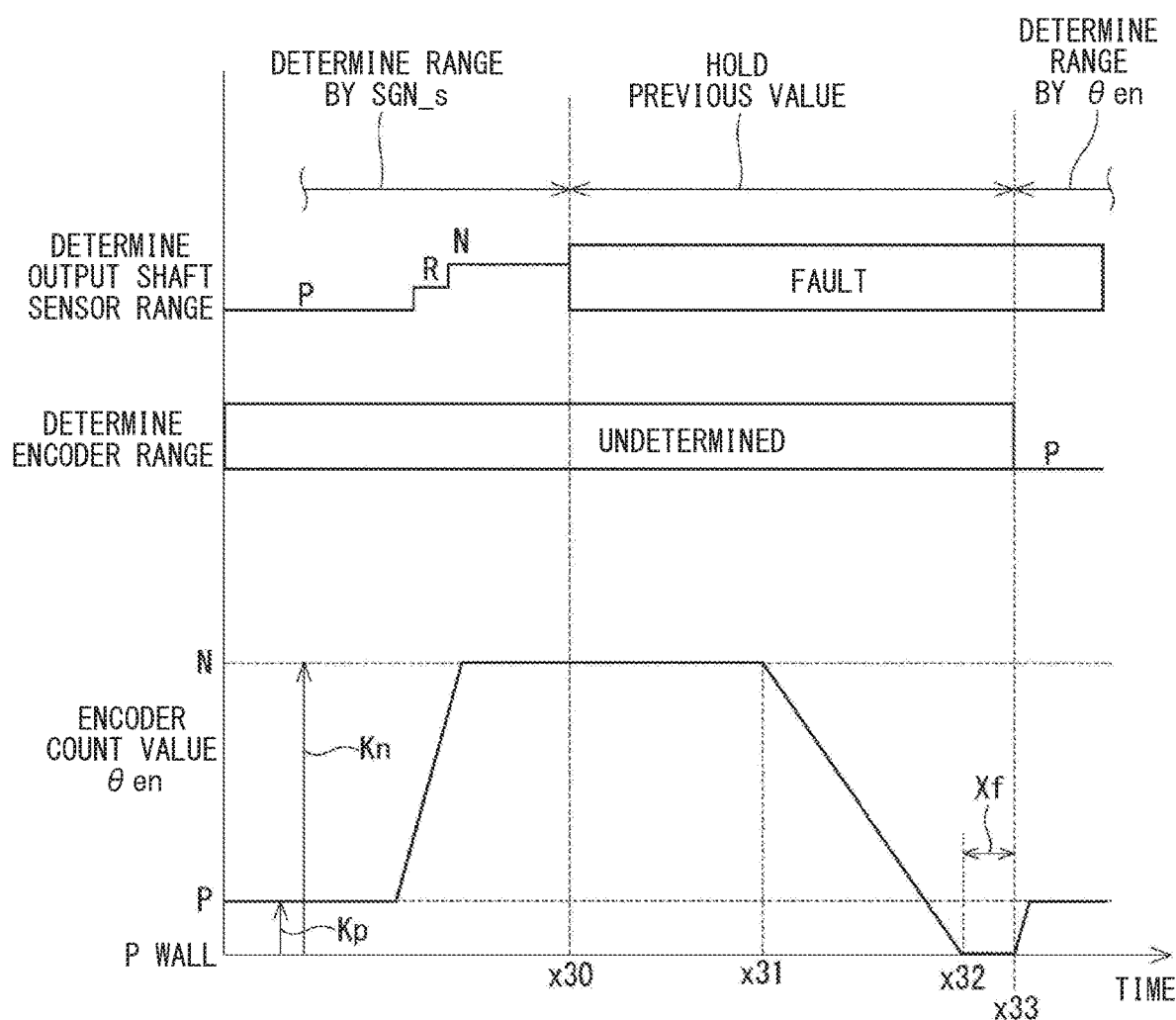
FIG. 7 is a time chart illustrating the output shaft sensor fault process according to the first embodiment.

FIG. 7 shows an example in which a fault occurs in the output shaft signal SGN_s when the shift range is the N range. When the output shaft signal SGN_s is a value V3 and a fault occurs in the output shaft signal SGN_s at a time x30 at which the N range is determined, the range determination based on the output shaft signal SGN_s is stopped, and the N range of the previous value is held. At a time x31, when the target shift range is switched to the P range at the vehicle speed of 0, the P wall abutment process is executed. The processing after a time x32 is the same as the processing after the time x22 in FIG. 6.

Figure 8:
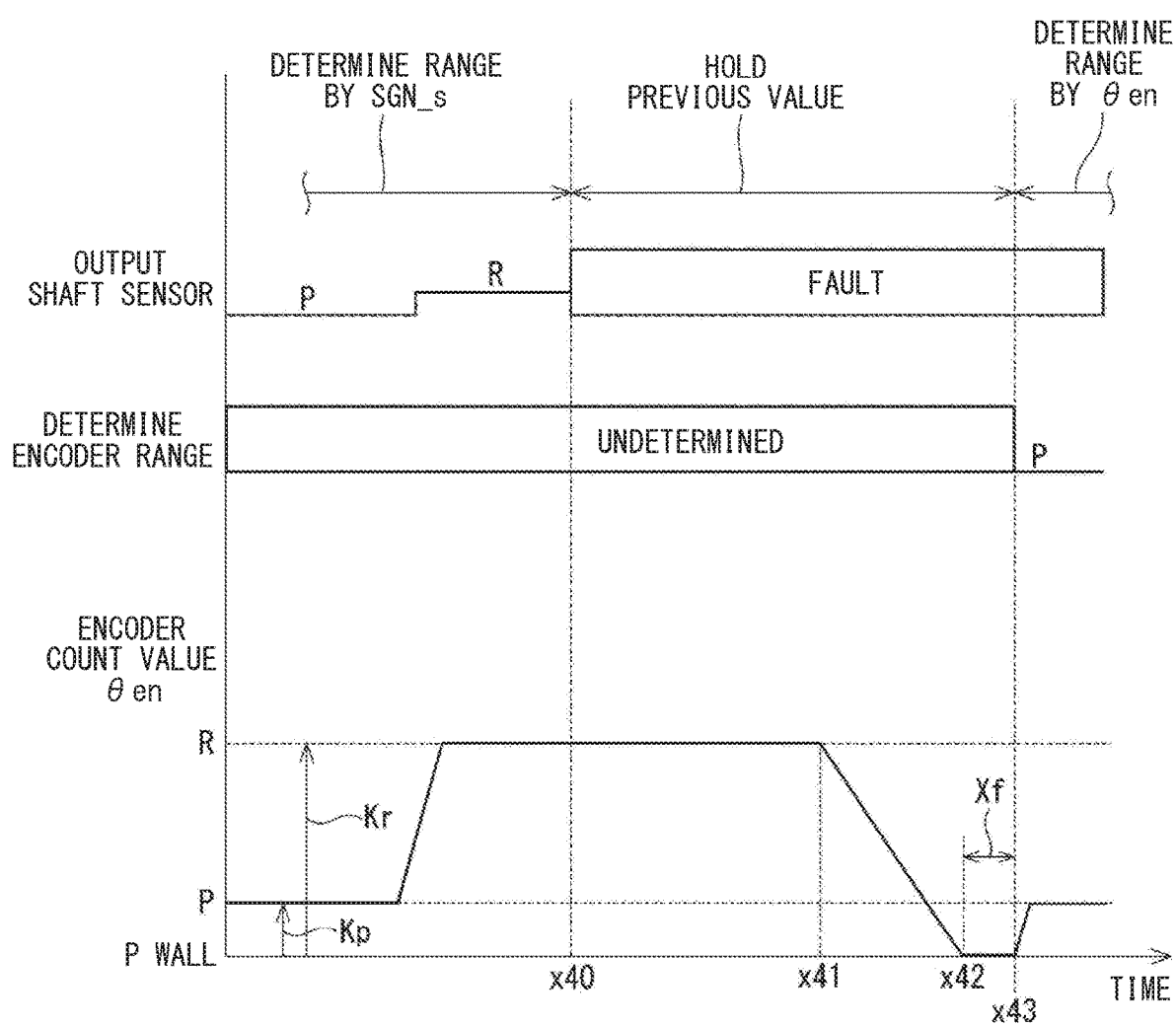
FIG. 8 is a time chart illustrating the output shaft sensor fault process according to the first embodiment.

FIG. 8 shows an example in which a fault occurs in the output shaft signal SGN_s when the shift range is the R range. When the output shaft signal SGN_s is a value V2 and a fault occurs in the output shaft signal SGN_s at a time x40 at which the R range is determined, the range determination based on the output shaft signal SGN_s is stopped, and the R range of the previous value is held. At a time x41, when the target shift range is switched to the P range at the vehicle speed of 0, the P wall abutment process is executed. The processing after a time x42 is the same as the processing after the time x22 in FIG. 6.

In the present embodiment, when a fault occurs in the output shaft sensor 16, if the shift range at the time of occurrence of the fault is the P range, the P wall abutment process is immediately executed, and one P-side reference position θen_p is learned. When the shift range is other than the P range and the shift range can be switched to the P range, the P wall abutment process is immediately executed. Regardless of the range at the time of occurrence of the fault, the P wall abutment process is executed so that an appropriate target count value θcmd can be set and the range can be determined based on the angle from the first wall portion 231, and the retraction traveling performance can be ensured.

The shift range control apparatus 40 switches the shift range by controlling the driving of the motor 10 in the shift-by-wire system 1. The shift-by-wire system 1 includes the motor 10, the output shaft 15, and the shift range switching mechanism 20. The driving of the motor 10 is transmitted to the output shaft 15.

The shift range switching mechanism 20 includes the detent plate 21 and the detent roller 26. The detent plate 21 has the roots 221 to 224 and the wall portions 231 and 232 and rotates with the output shaft 15. The roots 221 to 224 include the root 221 provided on one end side and corresponding to the P range, and the root 224 provided on the other end side and corresponding to the D range which is a range other than the P range. The first wall portion 231 is provided on one end side of the root 221. The second wall portion 232 is provided on the other end side of the root 224. The detent roller 26 fits in any one of the roots 221 to 224 corresponding to the shift range.

The shift range control apparatus 40 includes the motor angle calculation unit 51, the output shaft signal acquisition unit 52, the target angle setting unit 53, the drive control unit 54, the range determination unit 55, the fault monitoring unit 56, and the learning unit 57.

The motor angle calculation unit 51 acquires the motor rotation angle signal SGN_en corresponding to the rotation position of the motor 10 from the encoder 13 that detects the rotation of the motor 10, and calculates the encoder count value θen based on the motor rotation angle signal SGN_en. The output shaft signal acquisition unit 52 acquires the output shaft signal SGN_s corresponding to the rotation position of the output shaft 15 from the output shaft sensor 16 that detects the rotation position of the output shaft 15. The target angle setting unit 53 sets the target count value θcmd based on the target shift range and the output shaft signal SGN_s. The drive control unit 54 controls the driving of the motor 10 so that the encoder count value θen reaches the target count value θcmd.

The range determination unit 55 determines the shift range based on the output shaft signal SGN_s. The fault monitoring unit 56 monitors the fault of the output shaft signal SGN_s. When a fault occurs in the output shaft signal SGN_s, the learning unit 57 can learn the P-side reference position θen_p corresponding to the encoder count value θen when the detent roller 26 abuts against the first wall portion 231.

When a fault occurs in the output shaft signal SGN_s, the learning unit 57 learns the P-side reference position θen_p by bringing the detent roller 26 into abutment with the first wall portion 231 by driving the motor 10 when the shift range at the time of occurrence of the fault in the output shaft signal SGN_s is the P range. The range determination unit 55 determines the shift range based on the P-side reference position θen_p and the encoder count value θen. The target angle setting unit 53 sets a target count value θcmd based on the P-side reference position θen_p.

In the present embodiment, when a fault occurs in the output shaft signal SGN_s and the shift range is the P range, the P side wall abutment process is immediately executed to learn the P-side reference position θen_p. Then, the range is determined based on the P-side reference position θen_p and the encoder count value θen_p, so that the appropriate target count value θcmd can be set and the range determination can be executed, and the retraction traveling performance at the time of fault of the output shaft signal SGN_s can be ensured.

When the shift range at the time of occurrence of the fault in the output shaft signal SGN_s is other than the P range, the range determination unit 55 learns the P-side reference position θen_p when the shift range can be switched to the P range. As a result, the retraction traveling performance can be ensured by a relatively simple control regardless of the range at the time of occurrence of the fault in the output shaft signal SGN_s.

Second Embodiment

A second embodiment will be described with reference to FIGS. 9 to 12. In the embodiment described above, the P-side reference position θen_p is learned by performing the P wall abutment process regardless of the range when the fault occurs in the output shaft sensor 16. In the present embodiment, if a shift range at the time of occurrence of a fault in the output shaft sensor 16 is a D range, a detent roller 26 is brought into abutment with a second wall portion 232 to immediately perform a D wall abutment process for learning a D-side reference position θen_d, thereby ensuring a retraction traveling.

Figure 9:
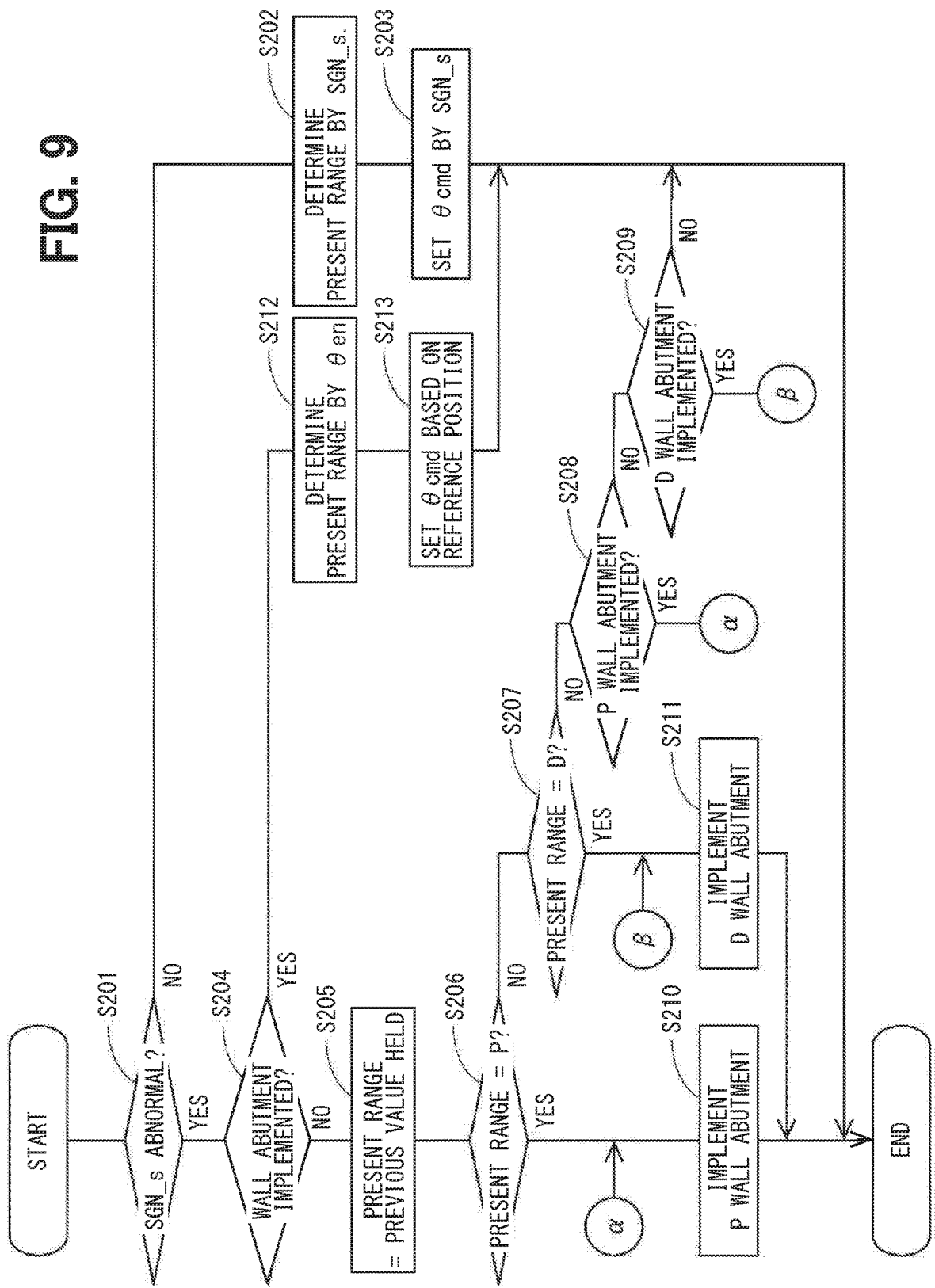
FIG. 9 is a flowchart illustrating an output shaft sensor fault process according to a second embodiment.

An output shaft sensor fault process according to the present embodiment will be described with reference to a flowchart of FIG. 9. Processes of S201 to S206 are the same as the processes of S101 to S106 in FIG. 4. If it is determined in S204 that a wall abutment process has been executed (YES in S204), the process proceeds to S212. When it is determined in S206 that the present shift range is a P range (YES in S206), the process proceeds to S210, and when it is determined that the present shift range is not the P range (NO in S206), the process proceeds to S207.

In S207, the learning unit 57 determines whether the present shift range is a D range. If it is determined that the present shift range is the D range (YES in S207), the process proceeds to S211. When it is determined that the present shift range is not the D range (NO in S207), that is, when the present shift range is an R range or an N range, the process proceeds to S208.

In S208, the learning unit 57 determines whether a P wall abutment process can be executed, in the same manner as that in S107. If it is determined that the P wall abutment process can be executed (YES in S208), the process proceeds to S210. If it is determined that the P wall abutment process cannot be executed (NO in S208), the process proceeds to S209.

In S209, the learning unit 57 determines whether the D wall abutment process can be executed. In the present embodiment, when the target shift range is switched to the D range, it is determined that the D wall abutment process can be executed. If it is determined that the D wall abutment process can be executed (YES in S209), the process proceeds to S211. If it is determined that the D wall abutment process cannot be executed (NO in S209), the following process is not executed, and the present routine is completed.

In S210, the ECU 50 executes a P wall abutment process, in the same manner as that in S108. In S211, the ECU 50 executes the D wall abutment process. In the D wall abutment process, the motor 10 is rotated in a forward direction at a speed lower than that at the time of normal range switching so that the detent roller 26 abuts against the second wall portion 232. When a state in which the encoder count value θen does not change continues over a completion determination time Xf, the ECU 50 stores an coder count value θen at this time in a storage unit or a storage (not shown) as a D-side reference position θen_d. In addition, the wall abutment completion flag is set.

In S212, the range determination unit 55 determines the present shift range based on the target shift range, a learned P-side reference position θen_p or D-side reference position θen_d, and the present encoder count value θen. In S213, a target angle setting unit 53 sets a target count value θcmd based on the learned P-side reference position θen_p or D-side reference position θen_d and a target design value corresponding to the target shift range. If the learned reference position is the P-side reference position θen_p, the processes of S212 and S213 are the same as those of S109 and S110.

When the learned reference position is the D-side reference position θen_d the range determination unit 55 determines the present shift range based on the D-side reference position θen_d, the range determination value stored in advance, and the present encoder count value θen. The range determination value is set for each range, and is a count number from the second wall portion 232 that determines that the range determination value is the above range.

Figure 10:
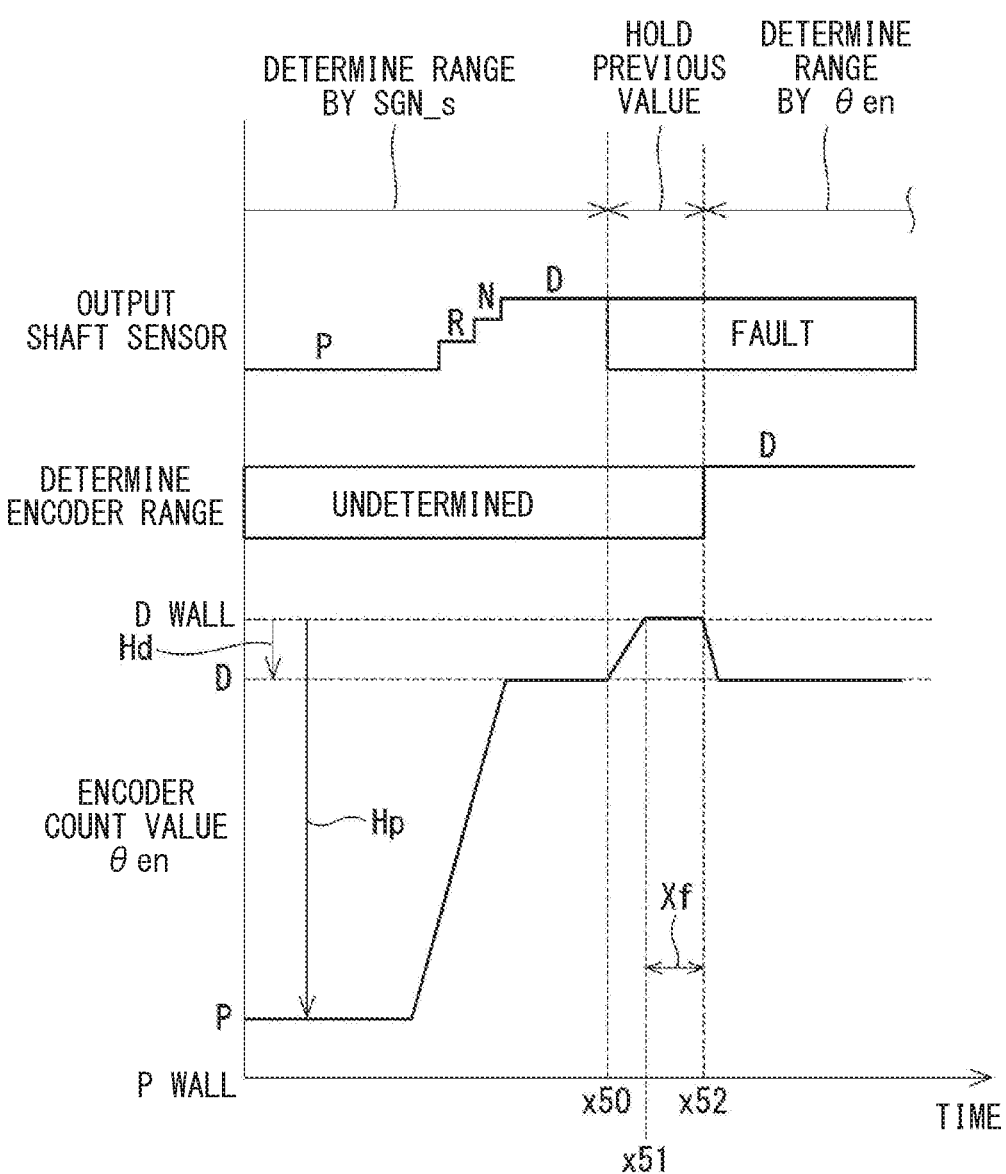
FIG. 10 is a time chart illustrating the output shaft sensor fault process according to the second embodiment.
Figure 11:
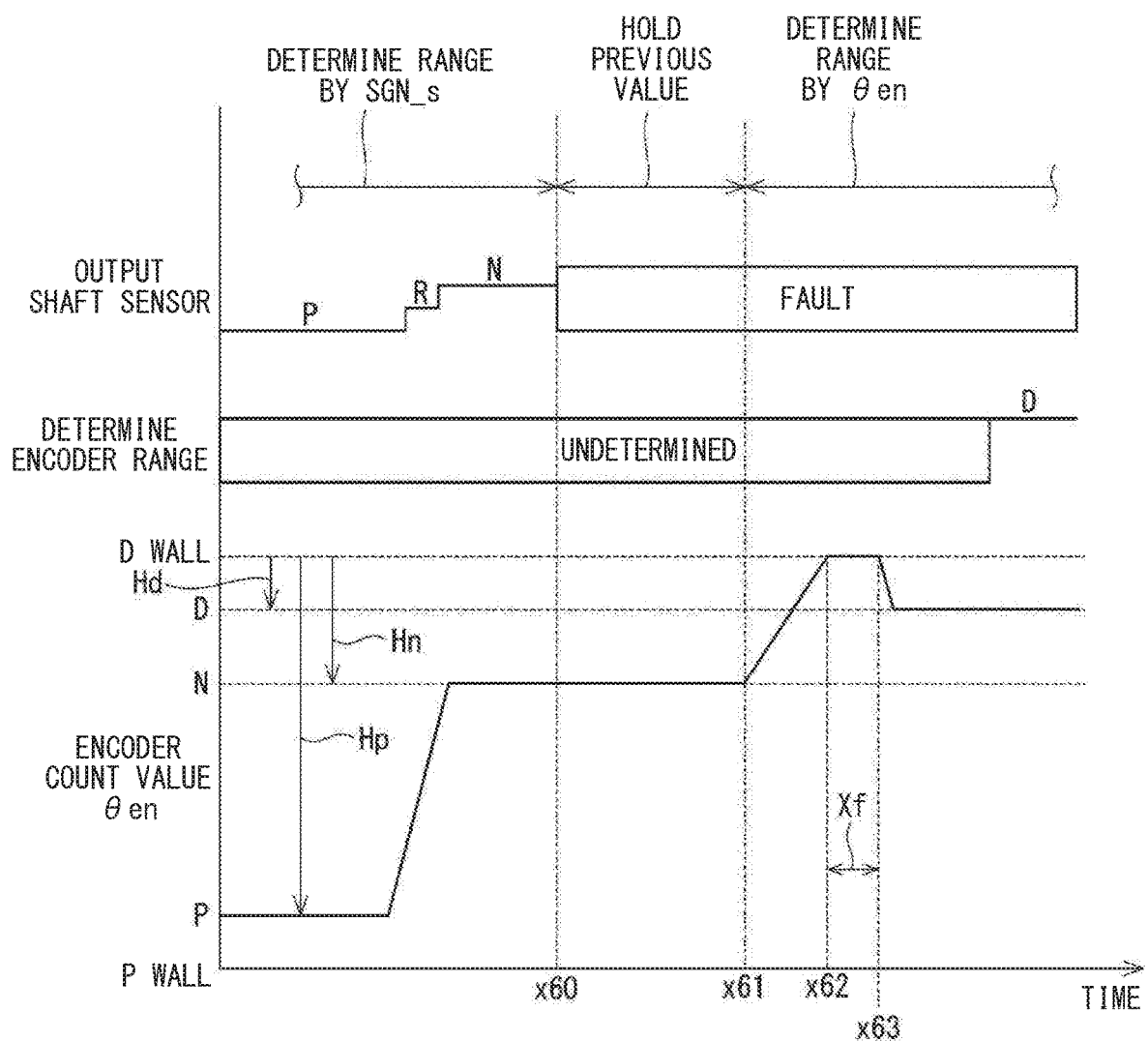
FIG. 11 is a time chart illustrating the output shaft sensor fault process according to the second embodiment.
Figure 12:
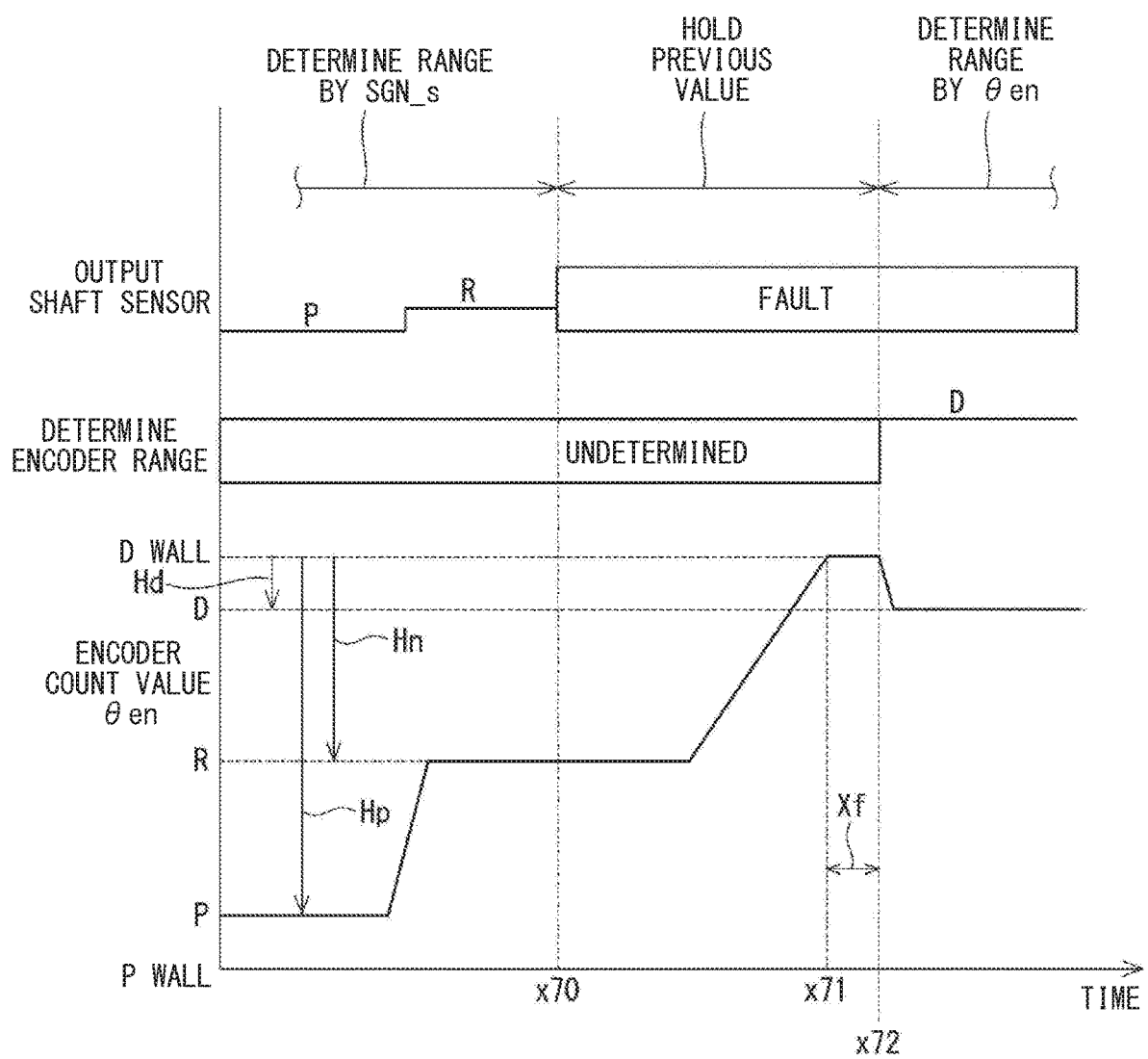
FIG. 12 is a time chart illustrating the output shaft sensor fault process according to the second embodiment.

The target angle setting unit 53 sets the target count value θcmd based on the learned D-side reference position θen_d and the target design values Hp, Hr, Hn, and Hd corresponding to the target shift range. As shown in FIGS. 10 to 12, the target design values Hp, Hr, Hn, and Hd are encoder counts corresponding to angles between the second wall portion 232 and the bottommost portions of the roots 221 to 224. The target design values Hp, Hr, Hn, and Hd are opposite in positive and negative to the target design values Kp, Kr, Kn, and Kd, and in this example, the target design values Kp, Kr, Kn, and Kd are positive and the target design values Hp, Hr, Hn, and Hd are negative.

Mathematical Expression (5) shows the target count value θcmd when the target shift range is the P range, Mathematical Expression (6) shows the target count value θcmd when the target shift range is the R range, Mathematical Expression (7) shows the target count value θcmd when the target shift range is the N range, and Mathematical Expression (8) shows the target count value θcmd when the target shift range is the D range.

$$\theta cmd = \theta en\_d + Hd \quad (5)$$

$$\theta cmd = \theta en\_d + Hn \quad (6)$$

$$\theta cmd = \theta en\_d + Hr \quad (7)$$

$$\theta cmd = \theta en\_d + Hp \quad (8)$$

An output shaft sensor fault process according to the present embodiment will be described with reference to time charts of FIGS. 10 to 12. Since a case of learning the P-side reference position θen_p is the same as in the above embodiment, a case of learning the D-side reference position θen_d will be described in this example.

FIG. 10 shows an example in which a fault occurs in an output shaft signal SGN_s when the shift range is the D range. While the output shaft signal SGN_s is in the normal state, the range determination based on the output shaft signal SGN_s is executed, and the range determination based on the encoder count value θen is not executed. When the output shaft signal SGN_s has a value V4 and a fault occurs in the output shaft signal SGN_s at a time x50 at which the D range is determined, the D wall abutment process is immediately executed. Specifically, the detent roller 26 rotates the motor 10 in a direction toward the second wall portion 232.

At a time x51, when the detent roller 26 brings into abutment with the second wall portion 232, the encoder count value θen is kept constant. At a time x52 when a completion determination time Xf elapses after the encoder count value θen is kept constant, the D wall abutment process is completed, and the encoder count value θen at this time is stored as the D-side reference position θen_d. The shift range holds the D range of the previous value between the time x50 at which the fault of the output shaft signal SGN_s occurs and the time x52 at which the D wall abutment process is completed.

When the D wall abutment process is completed, the motor 10 is rotated in the opposite direction by the target design value Hd, and the detent roller 26 is returned to the bottommost portion of the root 224. The rotation speed of the motor 10 at that time may be higher than that at the time of performing the wall abutment process, and may be, for example, the same as that at the time of normal range switching. Since the setting of the range determination and the target count value θcmd after the completion of the wall abutment is the same as the case in which the P-side reference position θen_p is learned except that the target design value and the range determination value are different from each other, a description of the same processing will be omitted.

FIG. 11 shows an example in which a fault occurs in the output shaft signal SGN_s when the shift range is the N range. When the output shaft signal SGN_s is the value V3 and a fault occurs in the output shaft signal SGN_s at a time x60 at which the N range is determined, the range determination based on the output shaft signal SGN_s is stopped, and the N range of the previous value is held. At a time x61, when the target shift range is switched to the D range, the D wall abutment process is executed. The processing after the time x61 is the same as that after the time x51 in FIG. 10.

FIG. 12 shows an example in which a fault occurs in the output shaft signal SGN_s when the shift range is the R range. When the output shaft signal SGN_s is the value V2 and a fault occurs in the output shaft signal SGN_s at a time x70 at which the R range is determined, the range determination based on the output shaft signal SGN_s is stopped, and the R range of the previous value is held. At a time x71, when the target shift range is switched to the D range, the D wall abutment process is executed. The processing after the time x71 is the same as that after the time x51 in FIG. 10.

In the present embodiment, if the shift range when a fault occurs in the output shaft sensor 16 is the P range, the P wall abutment process is immediately executed, and if the shift range is in the D range, the D wall abutment process is immediately executed. If the shift range when a fault occurs in the output shaft sensor 16 is the R range or the N range, the wall abutment process is executed when the P wall abutment or the D wall abutment can be executed. As a result, the wall abutment process can be executed promptly.

When a fault occurs in the output shaft signal SGN_s, the learning unit 57 can learn the D-side reference position θen_d, which is the P-opposite-side reference position corresponding to the encoder count value θen when the detent roller 26 abuts against the second wall portion 232.

When a fault occurs in the output shaft signal SGN_s, the learning unit 57 learns the D-side reference position θen_d by bringing the detent roller 26 into abutment with the second wall portion 232 when the shift range at the time of occurrence of the fault in the output shaft signal SGN_s is the D range which is the P-opposite-side range. The range determination unit 55 determines the shift range based on the D-side reference position θen_d and the encoder count value θen. The target angle setting unit 53 sets the target count value θcmd based on the D-side reference position θen_d. As a result, when the shift range at the time of occurrence of the fault is the D range, the reference position can be learned promptly.

Three or more roots 221 to 224 are provided in the detent plate 21. When the shift range at the time of occurrence of an fault in the output shaft signal SGN_s is the R range or the N range which is an intermediate range, the learning unit 57 learns the P-side reference position θen_p when the shift range can be switched to the P range, or the learning unit 57 learns the D-side reference position θen_d when the shift range can be switched to the D range. As a result, even if the range at the time of occurrence of a fault in the output shaft signal SGN_s is in the R range or the N range, the retraction traveling performance can be ensured.

Third Embodiment

Figure 13:
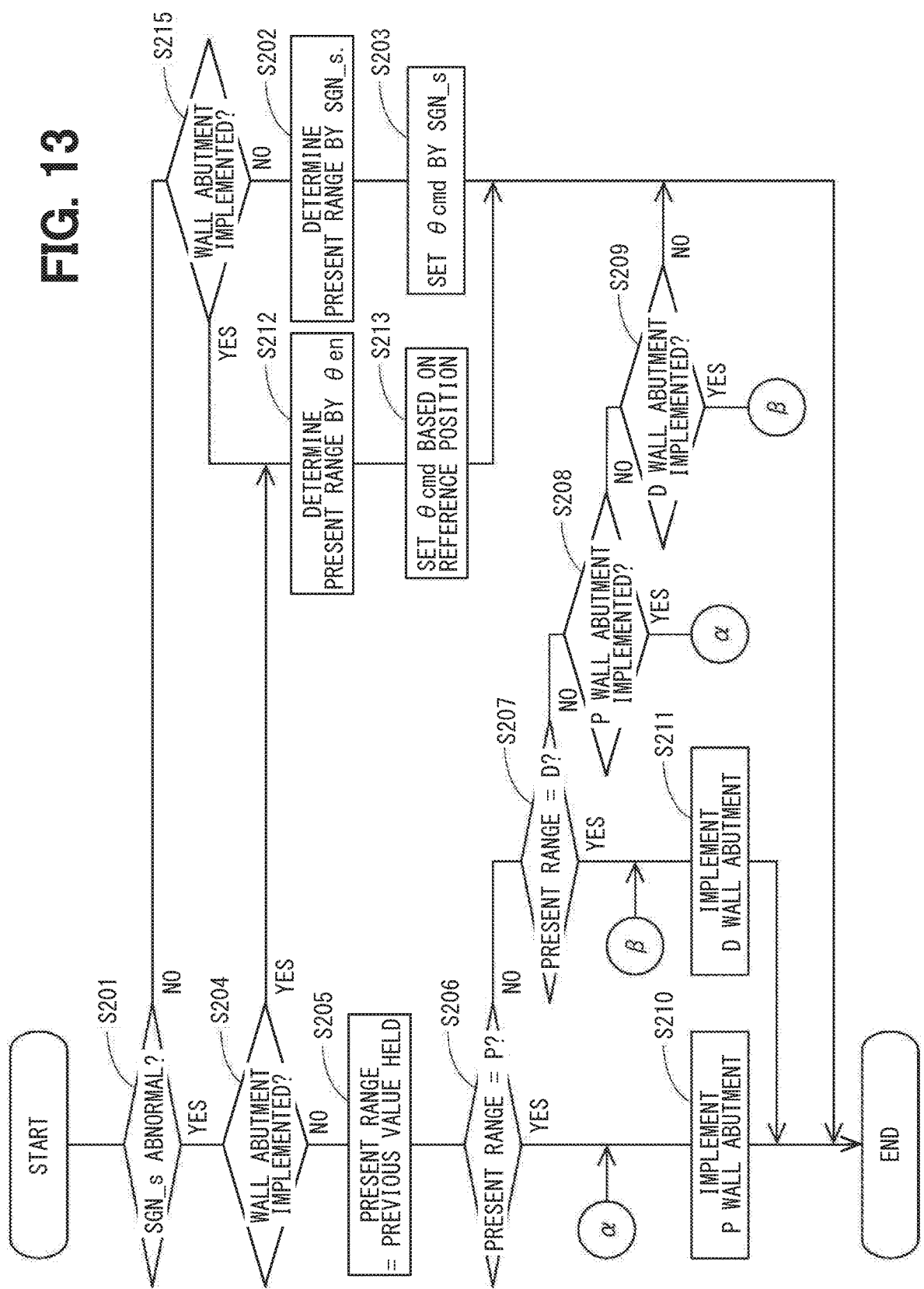
FIG. 13 is a flowchart illustrating an output shaft sensor fault process according to a third embodiment.
Figure 14:
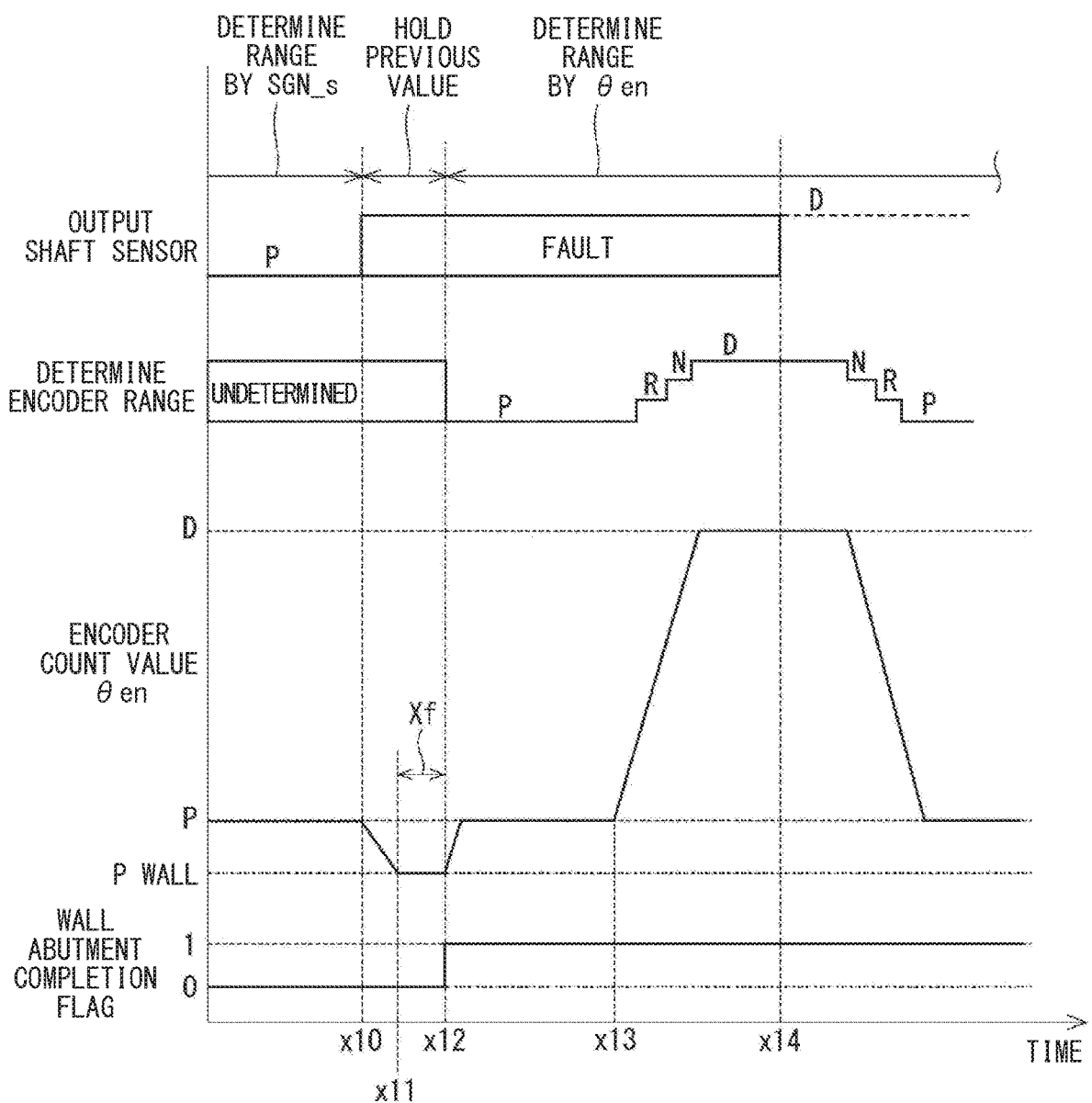
FIG. 14 is a time chart illustrating the output shaft sensor fault process according to the third embodiment.

A third embodiment will be described with reference to FIGS. 13 and 14. An output shaft sensor fault process according to the present embodiment will be described with reference to a flowchart of FIG. 13. In the flowchart of FIG. 13, S215 is added to the flowchart of FIG. 9.

When it is determined in S201 that no fault has occurred in an output shaft signals SGN_s (NO in S201), the process proceeds to S215. In S215, a range determination unit 55 determines whether a wall abutment process has been executed, as in S104 of FIG. 4. If it is determined that the wall abutment process has been executed (YES in S215), the process proceeds to S212. If it is determined that the wall abutment process has not been executed (NO in S215), the process proceeds to S203. The other processing is the same as that of FIG. 9.

The output shaft sensor fault process according to the present embodiment will be described with reference to a time chart of FIG. 14. FIG. 14 shows a wall abutment completion flag in addition to range determinations based on an output shaft signal SGN_s and an encoder count value θen, and the encoder count value θen. A state in which the wall abutment completion flag is set is set to "1" and a state in which the wall abutment completion flag is not set is set to "0". The processing up to a time x13 is the same as that of FIG. 5, and when the output shaft signal SGN_s turns out to have a fault when the shift range is the P range, a P wall abutment process is immediately implemented, and a P-side reference position θen_p is learned. At this time, the wall abutment completion flag is set.

At a time x14, the output shaft signal SGN_s returns to the normal state. At that time, since a state in which the wall abutment completion flag is set without being reset is continued, an affirmative determination is made in S215 of FIG. 13. In other words, when the output shaft signal SGN_s turns out to have a fault and the wall abutment process is executed, even if the output shaft signal SGN_s returns to the normal state, the range determination is executed based on the encoder count value θen until a start switch of a vehicle is turned off. In addition, the target count value θcmd is set by adoption of the learned reference position.

In the present embodiment, a case in which the P-side reference position θen_p and the D-side reference position θen_d can be learned as in the second embodiment has been described. Alternatively, as in the first embodiment, the present disclosure may be applied to an example in which the P-side reference position θen_p is learned regardless of the range at the time of occurrence of a fault. Specifically, when a negative determination is made in S104 in FIG. 4, the determination process similar to S215 is executed. In this example, if an affirmative determination is made, the process proceeds to S109, and if a negative determination is made, the process may process to S102.

In the present embodiment, even when the output shaft signal SGN_s returns to the normal state after an fault has occurred in the output shaft signal SGN_s, the range determination unit 55 continues the range determination based on the P-side reference position θen_p or the D-side reference position θen_d, which is the learned reference position, and the encoder count value θen. In the same manner, the target angle setting unit 53 continues to set the target count value θcmd based on the learned P-side reference position θen_p or D-side reference position θen_d even when the output shaft signal SGN_s returns to the normal state after the occurrence of the fault in the output shaft signal SGN_s. As a result, when a state in which the output shaft signal SGN_s is normal and a state in which the output shaft signal SGN_s has a fault are repeated due to, for example, a contact fault or the like, the control is prevented from being frequently switched while being dragged by repetition of the normal state and the fault state. In addition, since the return process is not necessary, the control can be simplified.

Other Embodiments

In the embodiments described above, four roots are provided in the detent plate. In other embodiments, the number of roots provided in the detent plate is not limited to four and may be any number as long as the number is two or more.

For example, the number of roots of the detent plate may be two, and the P range and NotP range, which is a range other than the P range, may be switched. In this instance, the root corresponding to the NotP range is a "second root" and the range other than the P range is the "P-opposite-side range". The shift range switching mechanism, the parking lock mechanism, and the like may be different from those of the embodiments described above.

In the embodiments described above, the number of engagement positions, which is the number of roots, coincides with the number of steps of the output shaft signals. In other embodiments, the number of engagement positions and the number of steps of the output shaft signals may be different from each other. The output shaft signal is not limited to a signal that changes in a stepwise manner, and may be any signal whose value changes in accordance with the rotation of the output shaft, such as a signal whose value changes linearly. The output shaft sensor is not limited to a magnetic sensor, and any sensor capable of detecting the rotation of the output shaft, such as a potentiometer, may be used.

In the embodiments described above, the motor is an SR motor. In other embodiments, the motor may be any motor, such as, for example, a DC brushless motor. In the embodiments described above, the number of winding sets of the motor is not mentioned, but the number of winding sets may be one set or multiple sets. In the embodiments described above, the motor rotation angle sensor is an encoder. In other embodiments, the motor rotation angle sensor is not limited to the encoder, and any type such as a resolver may be used.

In the embodiment described above, a speed reducer is provided between the motor shaft and the output shaft. Although the details of the speed reducer are not mentioned in the embodiments described above, any configuration may be adopted, for example, a cycloid gear, a planetary gear, a spur gear for transmitting a torque from a speed reduction mechanism substantially coaxial with the motor shaft to the drive shaft, or a combination of those gears. In other embodiments, the speed reducer between the motor shaft and the output shaft may be omitted, or a mechanism other than the speed reducer may be provided. As described above, the present disclosure is not limited to the embodiments described above, and can be implemented in various forms without departing from the spirit of the present disclosure.

The control unit (may also be referred to as the controller) and the technique according to the present disclosure may be achieved by a dedicated computer provided by constituting a processor and a memory programmed to execute one or more functions embodied by a computer program. Alternatively, the control unit and the technique according to the present disclosure may be achieved by a dedicated computer provided by constituting a processor with one or more dedicated hardware logic circuits. Alternatively, the control unit and the technique according to the present disclosure may be achieved using one or more dedicated computers constituted by a combination of the processor and the memory programmed to execute one or more functions and the processor with one or more hardware logic circuits. Further, the computer program may store a computer-readable non-transitional tangible recording medium as an instruction to be executed by the computer.

The present disclosure has been described in accordance with the embodiments. However, the present disclosure is not limited to such embodiments and structures. The present disclosure also encompasses various modifications and variations within the scope of equivalents. Furthermore, various combination and formation, and other combination and formation including one, more than one or less than one element may be made in the present disclosure.

It is noted that a flowchart or the processing of the flowchart in the present application includes sections, each of which is represented, for instance, as S100. Further, each section can be divided into several sub-sections while several sections can be combined into a single section. Furthermore, each of thus configured sections can be also referred to as a device, module, or means.

What is claimed is:

1. A shift range control apparatus configured to control driving of a motor to switch a shift range in a shift range switching system including the motor, an output shaft to which the driving of the motor is transmitted, and a shift range switching mechanism having a rotation member and an engagement member, the shift range control apparatus comprising:
   a motor angle calculator configured to acquire, from a motor rotation angle sensor configured to detect rotation of the motor, a motor rotation angle signal corresponding to a rotation position of the motor, and calculate a motor angle based on the motor rotation angle signal;
   an output shaft signal acquisition sensor configured to acquire, from an output shaft sensor configured to detect a rotation position of the output shaft, an output shaft signal corresponding to the rotation position of the output shaft;
   a target angle setting device configured to set a target rotation angle based on a target shift range and the output shaft signal;
   a drive controller configured to drive the motor to cause the motor angle to reach the target rotation angle;
   a range determiner configured to determine the shift range based on the output shaft signal;
   a fault monitor configured to monitor a fault in the output shaft signal; and
   a learning device,
   wherein the rotation member of the shift range switching mechanism rotates with the output shaft, and includes a plurality of roots, a first wall portion, and a second wall portion,
   wherein the plurality of roots includes:
      a first root disposed close to a first end of the rotation member and corresponding to a park range, and
      a second root disposed close to a second end of the rotation member opposite from the first end and corresponding to a range other than the park range,
   wherein the first wall portion of the rotation member is disposed closer to the first end of the rotation member than the first root,
   wherein the second wall portion of the rotation member is disposed closer to the second end of the rotation member than the second root,
   wherein the engagement member of the shift range switching mechanism is configured to fit in one of the plurality of roots corresponding to the shift range,
   wherein the learning device is configured to learn a P-side reference position corresponding to the motor angle in a situation where the engagement member abuts against the first wall portion of the rotation member, in a condition that the fault occurs in the output shaft signal, and
   wherein, in a condition that the fault occurs in the output shaft signal, the learning device learns the P-side reference position by causing the engagement member to abut against the first wall portion through the driving of the motor, in a situation where the shift range at an occurrence of the fault in the output shaft signal is the park range, the range determiner determines the shift range based on the P-side reference position and the motor angle, and the target angle setting device sets the target rotation angle based on the P-side reference position.

2. The shift range control device according to claim 1, wherein, in a condition that the shift range at an occurrence of the fault in the output shaft signal is a range other than the park range, the range determiner learns the P-side reference position in a situation where the shift range is switchable to the park range.

3. The shift range control device according to claim 1, wherein, in a condition that the fault occurs in the output shaft signal, the learning device is configured to learn a P-opposite-side reference position corresponding to the motor angle in a situation where the engagement member abuts against the second wall, wherein the shift range at a time where the engagement member fits into the second root represents a P-opposite-side range, and wherein, in a condition that the fault occurs in the output shaft signal, the learning device learns the P-opposite-side reference position by causing the engagement member to abut against the second wall portion in a situation where the shift range at an occurrence of the fault in the output shaft signal is the P-opposite-side range, the range determiner determines the shift range based on the P-opposite-side reference position and the motor angle, and the target angle setting device sets the target rotation angle based on the P-opposite-side reference position.

4. The shift range control apparatus according to claim 3, wherein the plurality of roots further includes a third root disposed between the first root and the second root, wherein the shift range at a time where the engagement member fits into the third root represents an intermediate range, and wherein, in a condition that the fault occurs in the output shaft signal and the shift range at an occurrence of the fault in the output shaft signal is the intermediate range, the learning device learns the P-side reference position in a situation where the shift range is switchable to the park range, or learns the P-opposite-side reference position in a situation where the shift range is switchable to the P-opposite-side range.

5. The shift range control device according to claim 1, wherein, in a condition that the output shaft signal returns to a normal state after the fault has occurred, the range determiner continues determining the shift range based on the P-side reference position that has been learned and the motor angle, and the target angle setting device continues setting the target rotation angle based on the P-side reference position that has been learned.

6. A shift range control apparatus configured to control driving of a motor to switch a shift range in a shift range switching system including the motor, an output shaft to which the driving of the motor is transmitted, and a shift range switching mechanism having a rotation member and an engagement member, the shift range control apparatus comprising:

a processor; and a memory that stores instructions configured to, when executed by the processor, cause the processor to:

acquire, from a motor rotation angle sensor configured to detect rotation of the motor, a motor rotation angle signal corresponding to a rotation position of the motor and calculate a motor angle based on the motor rotation angle signal;

acquire, from an output shaft sensor configured to detect a rotation position of the output shaft, an output shaft signal corresponding to the rotation position of the output shaft;

set a target rotation angle based on a target shift range and the output shaft signal;

drive the motor to cause the motor angle to reach the target rotation angle;

determine the shift range based on the output shaft signal; and monitor a fault in the output shaft signal, wherein the rotation member of the shift range switching mechanism rotates with the output shaft, and includes a plurality of roots, a first wall portion and a second wall portion, wherein the plurality of roots includes:

a first root disposed close to a first end of the rotation member and corresponding to the park range; and a second root disposed close to a second end of the rotation member opposite from the first end and corresponding to a range other than the park range, wherein the first wall portion of the rotation member is disposed closer to the first end of the rotation member than the first root, wherein the second wall portion of the rotation member is disposed closer to the second end of the rotation member than the second root, wherein the engagement member of the shift range switching mechanism is configured to fit in one of the plurality of roots corresponding to the shift range, wherein the instructions further cause the processor to learn a P-side reference position corresponding to the motor angle in a situation where the engagement member abuts against the first wall portion of the rotation member, in a condition that the fault occurs in the output shaft signal, and wherein, in a condition that the fault occurs in the output shaft signal, the instructions further cause the processor to:

learn the P-side reference position by causing the engagement member to abut against the first wall portion through the driving of the motor, in a situation where the shift range at an occurrence of the fault in the output shaft signal is the park range;

determine the shift range based on the P-side reference position and the motor angle; and set the target rotation angle based on the P-side reference position.

* * * * *